United States Patent
MacGougan et al.

(10) Patent No.: US 12,432,523 B2
(45) Date of Patent: Sep. 30, 2025

(54) PROACTIVE PROVISION OF POSITIONING INFORMATION BASED ON USER CONTEXT

(71) Applicant: Apple Inc., Cupertino, CA (US)

(72) Inventors: Glenn Donald MacGougan, San Jose, CA (US); Isaac Thomas Miller, Half Moon Bay, CA (US); Pejman Lotfali Kazemi, San Francisco, CA (US); Richard B. Warren, Redwood City, CA (US); William Joseph Bencze, Half Moon Bay, CA (US)

(73) Assignee: APPLE INC., Cupertino, CA (US)

( * ) Notice: Subject to any disclaimer, the term of this patent is extended or adjusted under 35 U.S.C. 154(b) by 348 days.

(21) Appl. No.: 18/305,723

(22) Filed: Apr. 24, 2023

(65) Prior Publication Data

US 2023/0362582 A1 Nov. 9, 2023

Related U.S. Application Data

(60) Provisional application No. 63/339,898, filed on May 9, 2022.

(51) Int. Cl.
  *H04W 4/021* (2018.01)
(52) U.S. Cl.
  CPC .................... *H04W 4/021* (2013.01)
(58) Field of Classification Search
  CPC ....... H04W 4/021; H04W 64/00; H04W 4/90; H04M 1/72415; G01C 21/3697; G01C 21/3476; G01C 21/3484; G01C 21/3679
  See application file for complete search history.

(56) References Cited

U.S. PATENT DOCUMENTS

| | | | |
|---|---|---|---|
| 6,024,655 | A | 2/2000 | Coffee |
| 6,259,381 | B1 | 7/2001 | Small |
| 6,542,814 | B2 | 4/2003 | Polidi et al. |

(Continued)

FOREIGN PATENT DOCUMENTS

| | | |
|---|---|---|
| CN | 102098656 A | 6/2011 |
| CN | 102868968 A | 1/2013 |

(Continued)

OTHER PUBLICATIONS

Ludford, Pamela, J., et al., "Because I Carry My Cell Phone Anyway: Functional Location-Based Reminder Applications," CHI 2006 Proceedings, Apr. 22-27, 2006, Montreal, Quebec, Canada, pp. 889-898.

(Continued)

*Primary Examiner* — Joshua L Schwartz
(74) *Attorney, Agent, or Firm* — Kilpatrick Townsend & Stockton LLP

(57) ABSTRACT

Embodiments described herein provide for a system, a non-transitory machine-readable medium, and methods to provide location services. In an embodiment, a method provides receiving at least one indication that an electronic device is in transit to at least one defined location, establishing a first fence boundary for the at least one defined location, receiving an indication that the electronic device has crossed the first fence boundary and is in transit to a defined location, and establishing a second fence for the defined location, where the second fence provides a finer granularity fence for the defined location than the first fence.

20 Claims, 15 Drawing Sheets

(56) References Cited

U.S. PATENT DOCUMENTS

| | | |
|---|---|---|
| 6,865,476 B1 | 3/2005 | Jokerst, Sr. |
| 7,317,927 B2 | 1/2008 | Staton et al. |
| 7,480,566 B2 | 1/2009 | Laverty |
| 7,493,211 B2 | 2/2009 | Breen |
| 7,561,063 B2 | 7/2009 | Eckhart |
| 8,774,827 B2 | 7/2014 | Scalisi et al. |
| 8,825,404 B2 | 9/2014 | Mays |
| 8,995,322 B2 | 3/2015 | Huang et al. |
| 9,210,545 B2 | 12/2015 | Sabatelli et al. |
| 9,648,581 B1 | 5/2017 | Vaynblat et al. |
| 9,741,191 B1 | 8/2017 | Wong |
| 10,171,938 B2* | 1/2019 | Partheesh ........... H04L 12/2816 |
| 10,861,255 B1* | 12/2020 | Karp .................... G07C 5/0841 |
| 11,150,660 B1 | 10/2021 | Kabirzadeh et al. |
| 2004/0203854 A1 | 10/2004 | Nowak |
| 2005/0148340 A1 | 7/2005 | Guyot |
| 2006/0223518 A1 | 10/2006 | Haney |
| 2007/0143013 A1 | 6/2007 | Breen |
| 2007/0219706 A1 | 9/2007 | Sheynblat |
| 2008/0004043 A1 | 1/2008 | Wilson et al. |
| 2008/0139219 A1 | 6/2008 | Boeiro et al. |
| 2008/0186165 A1 | 8/2008 | Bertagna et al. |
| 2008/0287151 A1 | 11/2008 | Fjelstad et al. |
| 2009/0006566 A1 | 1/2009 | Veeramachaneni et al. |
| 2009/0113340 A1 | 4/2009 | Bender |
| 2009/0177384 A1 | 7/2009 | Walder |
| 2010/0004005 A1 | 1/2010 | Pereira et al. |
| 2010/0250727 A1 | 9/2010 | King et al. |
| 2010/0279706 A1 | 11/2010 | Dicke |
| 2010/0305842 A1 | 12/2010 | Feng |
| 2010/0318293 A1 | 12/2010 | Brush et al. |
| 2011/0051658 A1 | 3/2011 | Jin et al. |
| 2011/0137813 A1 | 6/2011 | Stewart |
| 2011/0238289 A1 | 9/2011 | Lehmann et al. |
| 2012/0008526 A1 | 1/2012 | Borghei |
| 2012/0054028 A1 | 3/2012 | Tengler et al. |
| 2012/0095918 A1 | 4/2012 | Jurss |
| 2012/0158283 A1 | 6/2012 | Arastafar |
| 2012/0284769 A1 | 11/2012 | Dixon et al. |
| 2012/0302256 A1 | 11/2012 | Pai et al. |
| 2013/0099977 A1 | 4/2013 | Sheshadri et al. |
| 2013/0178233 A1 | 7/2013 | McCoy et al. |
| 2014/0045521 A1 | 2/2014 | Grainger et al. |
| 2014/0370909 A1* | 12/2014 | Natucci, Jr. ....... H04W 52/0251 455/574 |
| 2015/0323341 A1 | 11/2015 | Farrell et al. |
| 2015/0365803 A1 | 12/2015 | Berger et al. |
| 2016/0183049 A1* | 6/2016 | Rotstein ................ H04W 4/021 455/456.1 |
| 2017/0086022 A1 | 3/2017 | Beattie, Jr. et al. |
| 2017/0153118 A1 | 6/2017 | Gum |
| 2019/0253831 A1* | 8/2019 | Wang ..................... G01S 19/51 |
| 2020/0272221 A1 | 8/2020 | Foster et al. |
| 2020/0404448 A1 | 12/2020 | Park et al. |
| 2021/0080260 A1 | 3/2021 | Tremblay et al. |

FOREIGN PATENT DOCUMENTS

| | | |
|---|---|---|
| DE | 102012208616 A1 | 12/2012 |
| EP | 1387590 A2 | 2/2004 |
| EP | 1777540 A1 | 4/2007 |
| EP | 2759804 A1 | 7/2014 |
| EP | 3402227 A1 | 11/2018 |
| EP | 3940620 A1 | 1/2022 |
| GB | 2491247 | 11/2012 |
| JP | 2003207556 A | 7/2003 |
| JP | 2009081865 A | 4/2009 |
| JP | 2010288162 A | 12/2010 |
| JP | 2011060065 A | 3/2011 |
| WO | 0141468 A2 | 6/2001 |
| WO | 0203093 A1 | 1/2002 |
| WO | 2010048995 A1 | 5/2010 |
| WO | 2011080622 A1 | 7/2011 |
| WO | 2012031255 A2 | 3/2012 |
| WO | 2012162192 A1 | 11/2012 |
| WO | 2013059618 A1 | 4/2013 |

OTHER PUBLICATIONS

Aljohani et al., "Predicting At-Risk Students Using Clickstream Data in the Virtual Learning Environment", 12 pages.

Final Office Action issued in U.S. Appl. No. 13/113,856, dated Nov. 7, 2012 in 20 pages.

Non-Final Office Action issued in U.S. Appl. No. 13/113,856, dated Jul. 18, 2012 in 15 pages.

Final Office Action issued in U.S. Appl. No. 13/488,430, dated May 8, 2013 in 20 pages.

Non-Final Office Action issued in U.S. Appl. No. 13/488,430, dated Dec. 5, 2012 in 14 pages.

Extended European Search Report issued in U.S. Application No. EP12168980.6, dated Sep. 21, 2012 in 7 pages.

Combined Search Report and Examination Report issued in U.S. Application No. GB1209044.5, dated Aug. 24, 2012 in 5 pages.

Office Action issued in Japan Application No. JP2012-113725, dated May 27, 2013 in 9 pages.

* cited by examiner

PROACTIVE PROVISION OF POSITIONING INFORMATION BASED ON USER CONTEXT

RELATED APPLICATIONS

This application claims the benefit of priority of U.S. Provisional Patent Application No. 63/339,898, entitled "Proactive Provision of Positioning Information Based on User Context," filed May 9, 2022, which is herein incorporated by reference.

FIELD

Embodiments described herein relate to provision of location services.

BACKGROUND INFORMATION

A reactive approach for requesting location information at launch of an application results in unreasonable delay for users. Yet, current approaches to providing constant positioning information for a device either drain the device battery or provide imprecise positioning information for a user device to avoid impacting operation of the device. As such, there is a need to provide location services with more precise positioning information.

SUMMARY

Embodiments described herein provide for a system, a non-transitory machine-readable medium, and methods to provide location services. In an embodiment, a method provides receiving at least one indication that an electronic device is in transit to at least one defined location, establishing a first fence boundary for the at least one defined location, receiving an indication that the electronic device has crossed the first fence boundary and is in transit to a defined location, and establishing a second fence for the defined location, where the second fence provides a finer granularity fence for the defined location than the first fence.

In some embodiments, the method further provides that in response to receiving at least one indication that the electronic device is in transit to the at least one defined location, sending a request to determine positioning information for the electronic device using a low power processor, in response to receiving the indication that the electronic device crosses the first fence boundary, sending a request to determine positioning information for the electronic device using an application processor, and retrieving information on establishing the second fence for the defined location. In some embodiments, the method further provides establishing the second fence with at least one of a radio frequency fingerprint or a building map. In some embodiments, the method further provides in response to receiving the indication that the electronic device crosses the first fence boundary, sending a request for application data associated with the defined location, upon detection of entry to the defined location with the second fence, presenting an interface for an application associated with the defined location, and launching the application with the received application data from the request. In some embodiments, the method further provides receiving, at the electronic device, at least one indication from a data source that the electronic device is in transit, in response to receiving the at least one indication that the electronic device is in transit, determining positioning information using a first mode, where the first mode comprises determining positioning information at periodic time intervals at a first performance and power state. In some embodiments, the method further provides storing positioning information at each periodic time interval. In some embodiments, the method further provides determining positioning information at periodic time intervals on an always-on low power processor. In some embodiments, the method further provides sending a request to determine positioning information using the second mode including sending a request to wake an application processor to determine positioning information.

In an embodiment, a method provides a receiving, from a data source accessible from an electronic device, at least one indication of a change in location status for the electronic device, determining a prediction for an upcoming location status based on the at least one indication and analysis of user data accessible on the electronic device and selecting a processor type for determining positioning information for the electronic device based on the prediction.

In some embodiments, the data source comprises at least one of application data, sensor data, a location history, a user routine history, a wireless connection status, and positioning information. In some embodiments, the method further provides that the at least one indication of the change comprises detecting at least one of a threshold duration of the electronic device in transit or limited wireless connectivity for the electronic device, and selecting a location status mode for determining positioning information for the electronic device based on the prediction, and performing periodic requests for positioning information in accordance with power capabilities of the electronic device in the selected location status mode. In some embodiments, the method further provides selecting a technique for determining positioning information for the electronic device based on the prediction. In some embodiments, the method further provides that the prediction for the upcoming location status comprises in transit status for the electronic device, and the method further provides adjusting a performance level for a technique for determining positioning information, and establishing, for the electronic device, a first fence boundary for the selected mode. In some embodiments, the method further provides that the prediction for the upcoming location status comprises entry to a defined location status for the electronic device, and the method further provides adjusting the performance level for determining positioning information, and establishing, for the electronic device, a second fence for the selected mode. In some embodiments, the method provides sending a request to determine positioning information on a second processor type in accordance with a second prediction for a change in location status. In some embodiments, the method further provides receiving, from a data source accessible from an electronic device, at least one indication that the electronic device is in transit, selecting a low power processor type for determining positioning information for the electronic device, determining the prediction for an upcoming location status based on the at least one indication is that the electronic device has crossed a fence boundary, and selecting a different processor type for determining positioning information for the electronic device based on the prediction.

In an embodiment, the method provides predicting a user request for historical positioning information for an electronic device based on analysis of user contextual data, receiving at least one indication of an intention of the user to request access to historical positioning information, performing periodic requests for positioning information in accordance with power capabilities of the electronic device, receiving a request, at the electronic device, for a path to a current location, and presenting, within a user interface, received positioning information in response to the request.

In some embodiments, the method further provides that the at least one indication comprises detecting at least one of a threshold duration of an electronic device in transit or a threshold limit for access to wireless services.

DETAILED DESCRIPTION

Figure 1:
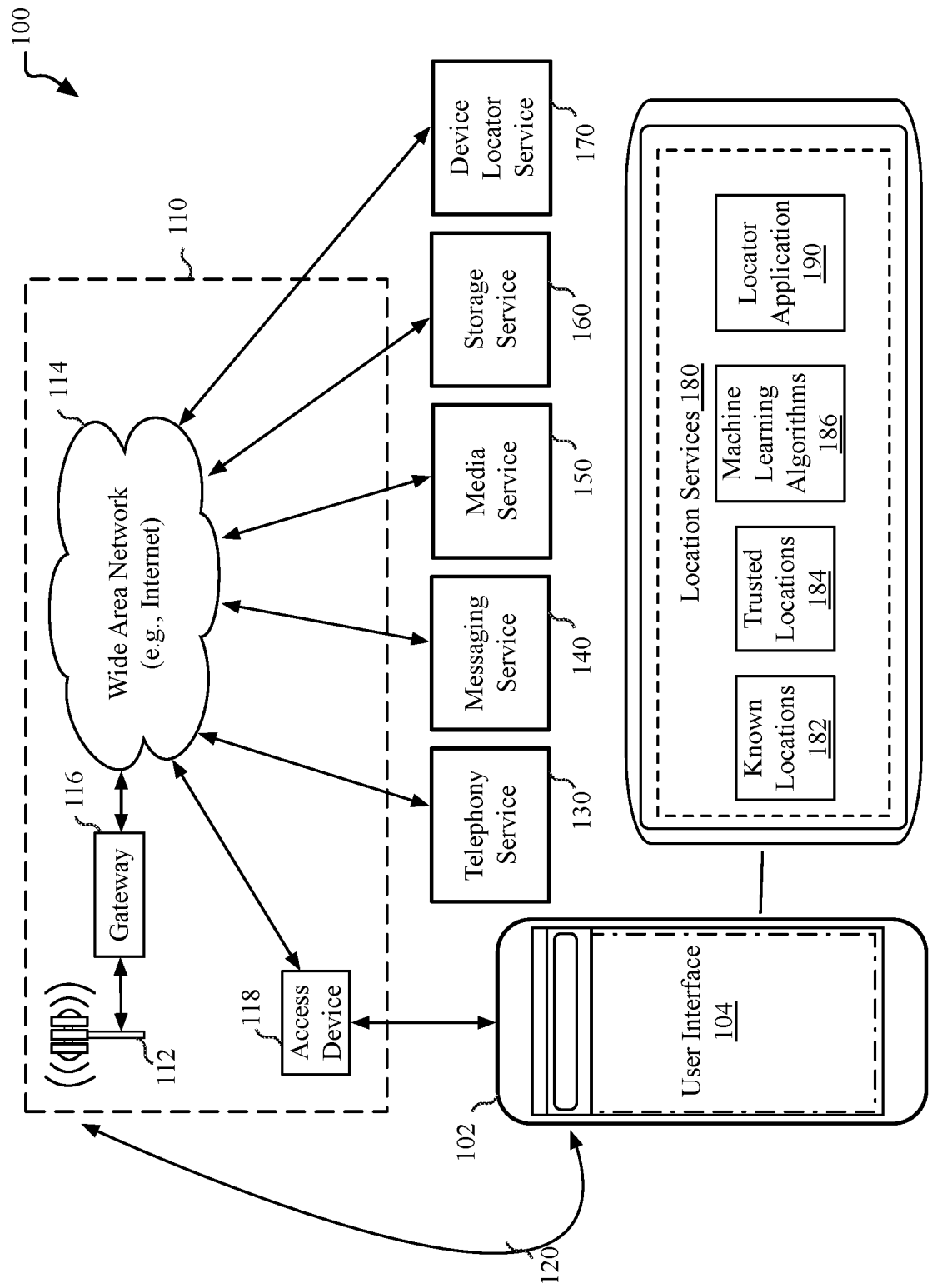
FIG. 1 is a block diagram of a network operating environment for mobile devices, according to an embodiment.

Embodiments described herein provide techniques to proactively determine positioning information of an electronic device in anticipation of applications, services, and/or positioning data a user may request on the electronic device with a given location status. Data is proactively obtained to reduce latency in provision of location services applications, data, and/or applications associated with a location. For example, an application associated with a defined location and/or data used by the application associated with the defined location may be obtained prior to entry to the defined location to immediately present the application upon entry. In another example, historical positioning information may be proactively obtained to allow a user to backtrack to a location when the user has gotten lost.

The location status may be a label for a user context (e.g., set of conditions) in which specific positioning techniques and resources of the electronic device are used to obtain positioning and/or bearing information. The location status may define a current location state, a motion state, a mode of transport, and/or a prediction of a change in location state of a user while traveling with the electronic device. By way of example, the location status may be "settled" in a location, leaving a location, in transit and near one or more locations, near entry to a defined location, in transit on unfamiliar route, and/or any other state relative to a location. Continuing with the example, a power savings mode, hardware (e.g., application processor, radio processor, low power processor, etc.) requested to wake and/or used for execution of requests, and/or fence techniques may be determined based on the detected location status to proactively provide data for the application associated with the location (e.g., a café) or location status (e.g., unfamiliar route while on a hike). By proactively obtaining data and/or application using techniques in accordance with the location status, latency is reduced in provision of the information for device applications without incurring a noticeable decline in performance of the electronic device that may be experienced with constant requests for positioning information.

User contextual data may be analyzed to determine if the user context exists to allow for a prediction for an upcoming location status and an indication from the user data that the user intends to change their location state as predicted. User contextual data sources accessible on the electronic device may be analyzed to determine current location status and an intention of a user to either change or remain in the current location status. Contextual user data received that provides an indication as to the intention of the user to change their location status as predicted may trigger a change in a corresponding location status mode for determining positioning information executing on the electronic device. Characteristics of the location status mode (e.g., system architecture and/or device component used, device services used, etc.) may have an expected impact on resources of the electronic device, such as a performance level for the functionality of the electronic device and an expected impact on battery performance. As such, transitions between location status modes may be thought of as escalating and/or de-escalating an impact on the resources of the electronic device.

To proactively provide positioning information, the operation of the electronic device may be thought of as a division of a time period (e.g., a day) into various locations states with a corresponding location status mode for determining positioning information. For example, the day may be thought of as moving through a series of location states: "settled" in a location, in transit, a first threshold distance from a defined location, a second threshold distance from the defined location, just prior to entry of the defined location. By way of further example, with each location state, the electronic device may optionally adjust the mode, the fence defined, and the hardware used to execute requests for the location services application. The location status mode for determining positioning information may define characteristics on approaches for determining positioning information with the electronic device. The location status mode may define a technique and/or an algorithm used to determine positioning information and/or data saved in anticipation of an application that a user may access. In some embodiments, the location status mode may define a granularity for a technique, such as a precision level for defining a fence for a location. By way of example, a coarse-grained fence for a location may be a boundary defined with a location point and a radius from the location point to serve as a boundary for the defined location. For example, when the indication of an upcoming location status is that a user is likely to enter a defined location and crosses the boundary for the defined location as defined with the coarse-grained fence, then a finer-grained fence may be established for the defined location. Continuing with the example, a finer-grained or refinement for the initial geofence may be to compare the values for the electronic device to values expected in regions of the defined location.

The location status mode may also define the speed at which a transition is made to another location status mode. The location status mode may determine system architectures and/or device components (e.g., processor types) used to determine positioning information.

Although some embodiments may be described with regards to location status changes that trigger the escalation or de-escalation of location status mode types (e.g., low power mode to a higher power mode), those with skill in the art will recognize that a predicted change in location status may trigger a change in any aspect of determining positioning information on the electronic device in order to proactively store data and suggest applications for execution on the electronic device.

In some embodiments, user contextual data may be used to predict a change in location status and the intention of the user to pursue the change in location status prior to impacting electronic device resources. As such, the prediction of the appropriate location status mode for determining positioning information is tied to the prediction for a location status change. For example, user contextual data may determine the selection of a mode that causes the escalation or de-escalation of power usage. In another example, the mode may determine a particular processor type for determining positioning information, such as whether positioning information requests are executed on an application processor or a low power "always on" processor (AOP), or whether the device executes requests on the processor with at periodic time interval to preserve the device battery. In some embodiments, the location status mode selection may have an impact on the performance of the electronic device due to the selection of technique used to determine positioning information. For example, global positioning systems (GPS) techniques may be used when analysis of the contextual user data indicates that the user may need greater precision in positioning data and the use of a particular GPS technique over other techniques may impact performance of other applications on the electronic device. The location status mode selected may rely on various techniques and sources to determine positioning information, such as use of a cell tower, motion sensors, Wi-Fi scans, GPS, etc.

User contextual data may be determined using various data sources and combinations of data sources accessible on the device to determine the location status. The location status may be defined with a label including, but not limited to the following: "at rest," "settled," "in transit," "near to entry of a defined location," etc. A variety of data sources may be analyzed to determine user context, including, but not limited to, the following: sensor data, known user routines, known locations of interest, detection of entry and/or exit of a vehicle (e.g., loss of Bluetooth connection to vehicle). In an embodiment, the location status mode may adapt based on user contextual data, such as time or events, that indicate time intervals for capturing positioning information. For example, if a user is in transit for a long period of time or cell service is limited (e.g., weak, intermittent access, etc.) potentially indicating a user is on a hike, then positioning information may proactively be captured to allow a user to retrace their steps. In another embodiment, the location status mode change may be an escalation from low power state with coarse location monitoring to a higher power state with more precise location monitoring. Escalation to higher power/performance states includes positioning technique changes such as from cellular to active Wi-Fi and GPS scan, changes to power states, and use of system ability to refine fence boundaries itself.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

FIG. 1 is a block diagram of a network operating environment 100 for mobile devices, according to an embodiment. The network operating environment 100 includes electronic devices, such as mobile device 102. In an embodiment, an accessory device may be paired with mobile device 102. By way of example, accessory devices may be devices such as Apple AirPods®, EarPods®, PowerBeats®, exercise equipment, vehicles, bicycles, scooters, smart televisions, Homepods, automated assistant devices, home security systems, and/or any other mobile accessory device. Mobile device 102 can each be any electronic device capable of communicating with a wireless network and/or a wireless accessory device. Some example mobile devices 102 include, but are not limited to, the following: a smartphone, a tablet computer, a notebook computer, a wearable device (e.g., smartwatch or other wearable computing accessory), a mobile media player, a personal digital assistant, AirPods®, EarPods®, PowerBeats®, locator tags, headphones, head mounted display, health equipment, speakers, and other similar devices. Each of mobile devices 102 optionally can include a user interface, such as user interface 104 of mobile device 102. In other embodiments, a mobile device, may not have a user interface. Mobile devices 102 may be a third-party device that utilizes an application programming interface to access device locator services. The third-party device may be provided by a different device manufacturer or be part of a different ecosystem (e.g., operating system) from mobile device 102. Mobile device 102 can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102 can place and receive phone calls (e.g., using VoIP protocols), send and receive e-mail messages (e.g., using POP3 protocol), and retrieve electronic documents and/or streams, such as web pages, photographs, and videos, over the wireless network 112 (as shown with 120), gateway 116, and wide area network 114 (e.g., using TCP/IP or UDP protocols). In some implementations, mobile device 102 can place and receive phone calls, send and receive e-mail messages, and retrieve electronic documents over the access device 118 and the wide area network 114. In some implementations, mobile device 102 can be physically connected to the access device 118 using one or more cables, for example, where the access device 118 is a personal computer. In this configuration, mobile device 102 can be referred to as a "tethered" device. In one embodiment, mobile device 102 can communicate with accessory devices via a wireless peer-to-peer connection. The wireless peer-to-peer connection (not shown) can be used to synchronize data between the devices.

Mobile device 102 can communicate with one or more services, such as a telephony service 130, a messaging service 140, a media service 150, a storage service 160, and a device locator service 170 over the one or more wired and/or wireless networks 110. For example, the telephony service 130 can enable telephonic communication between mobile devices or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102 to store documents and media files. The device locator service 170 can enable a user to locate a lost or misplaced device that was, at least at some point, connected to the one or more wired and/or wireless networks 110. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102.

Mobile device 102 may have applications, services, and functionality locally accessible on the devices including location services 180. Mobile devices 102 may have a device locator application (e.g., a "Find my" application) 190 to utilize device locator services 170 and location services 180 to locate accessory devices. Locally accessible data may be stored on defined locations, such as known locations 182 and safe, trusted locations 184. In some instances, machine learning algorithms 186 may be used to identify known locations 182, and/or trusted locations 184. Although cluster analysis is provided as an example of machine learning algorithms that may be used, those with skill in the art will recognize that other algorithms may be used to identify potential known or trusted locations. By way of example, cluster data analysis may be used to identify and classify and provide semantic labels for locations, such as locations frequented by a user. Safe, trusted locations 184 may be designated explicitly or confirmed as such by a user of the mobile device 102 after data analysis. In other instances, the known locations 182 or the trusted locations 184 may be classified offline and provided by device locator service 170 or a third-party (e.g., a database with map information).

On-device heuristics and/or machine learning models may be used to infer relationships between a user and locations based on analysis of the locally stored data on frequented locations including frequently visited locations by the user, known locations, and/or any other locations. For example, a frequently visited location such as a home, a vehicle, a workplace, any location frequented by a user with mobile device (e.g., accessory devices, and mobile device 102) and/or any other location designated as a trusted location 184 by the user. Known locations 182 may be business locations, public spaces, parks, museums, and/or any other location that may be frequented by a user.

Defined locations may have associated fence information that provides a set of conditions, if detected, allow for designating or classifying an electronic device relative to a region of physical space for at least a portion of the defined location. For example, fence information may provide the conditions for classifying the electronic device as either inside or outside a region of physical space associated with the defined location. In another example, fence information may provide the conditions for classifying the electronic device as transitioning between inside or outside the region of the defined location. Fence information may be a geofence with boundary information for the defined location, such as a point location and the extents of the region from the point location (e.g., a circular region defined with a radius from the point location, a polygon shape with distance measurements from the point location, etc.). Fence information may include a set of sensor measurements received by electronic devices (e.g., fingerprint data including radio frequency (RF) scan data, such as Wi-Fi scan traces, etc.) that are characteristic of a particular region of the defined location. Fence information for the respective defined locations may be stored along with classification type for the location and any semantic label assigned to the location. Boundary information may include a defined set of boundaries or a radius distance around a point location to allow for creation of a fence for the location. In some embodiments, the fence is a virtual perimeter for a real-world geographic area. Global positioning system (GPS) may be used to create a virtual fence around a location and track the physical location of the mobile device 102 within the geofence boundary as well as entry and exit of the bounded area. In some embodiments, there are at least two tiers of fences that may be used to reduce latency associated with geofences. The mode selected based on analysis of user contextual data to determine intent may determine the granularity of the fence established. In some embodiments, multiple fences may be used to refine positioning information determined by a coarse-grained geofence.

Machine learning algorithms 186 may include on-device heuristics, machine learning algorithms, or a combination thereof to analyze and assign a label regarding a user context, such as a location status. For example, the user context may indicate movement or travel of an electronic device to allow the electronic device to be designated as having a location status, such as "in transit", "settled" in a particular defined location for a time period, or any other defined location status. Analysis may be performed using a variety of signals from contextual user data sources available to the mobile device 102, including, but not limited to, the following: sensor data, positioning data, calendar data, transit card usage data, application data, historical data on patterns/routines of travel, wireless connection status with accessory devices and/or services (e.g., Bluetooth connection status), device location history, and/or any other data accessible to the mobile device 102. In an embodiment, the wireless connection status with various devices may indicate that the device is settled or "in transit." For example, a loss of a connection to an appliance, a security system, a heating/cooling systems, vehicles, other modes of transport, and/or any other devices may indicate that the mobile device is "in transit".

In some embodiments, a mobile device 102 may be classified with a "settled" semantic label after remaining within the geographic boundaries that define a location (e.g., the trusted location 184) for a defined time period. In an example, received positioning data for the mobile device 102 may indicate the electronic device 102 remained within the boundaries of a fence for a particular location for a duration of time (e.g., 5 minutes). Sensor data, such as accelerometer data, may indicate that the mobile device 102 is at rest to support an inference of being settled. Application data may support the inference that the mobile device 102 is settled, such as the mobile device being located at a calendar appointment location. Application data indicating a type of application in use may also provide an inference of the device being settled, such as using a media application. Historical data for the user on routines or patterns in travel may be used to determine whether the mobile device 102 is settled, such as a bedtime routine at a home or a hotel location.

Mobile device 102 may be classified as with an "in transit" label based on prior detected behavior, patterns, or routines for the user, and analyzed on mobile device 102. For example, the user may have routine of going to work around the same time every day and an "in transit" state may be assigned if the data on the device supports that the pattern is being repeated. A speed at which the mobile device is moving or entering and exiting known geographic areas (e.g., using fences) may allow for the inferring that the mobile device 102 is in transit. If the mobile device 102 is detected as accelerating in known areas of transit (e.g., on roads, highways, train routes, etc.), then the mobile device 102 may be given the location status of "in transit." Similarly, if transit applications/cards are used/in use, then the mobile device 102 may be designated as "in transit".

Mobile device 102 may be classified as a "threshold distance," "near an entry," "near an exit," "entry" and/or "exit" of a set of locations or a particular location based on crossing fence boundaries for the respective location or set of locations and/or detecting a pattern of sensor values that are characteristic of being in a location, such as Wi-Fi scan results characteristic of being inside a location or transitioning into a location.

Figure 2:
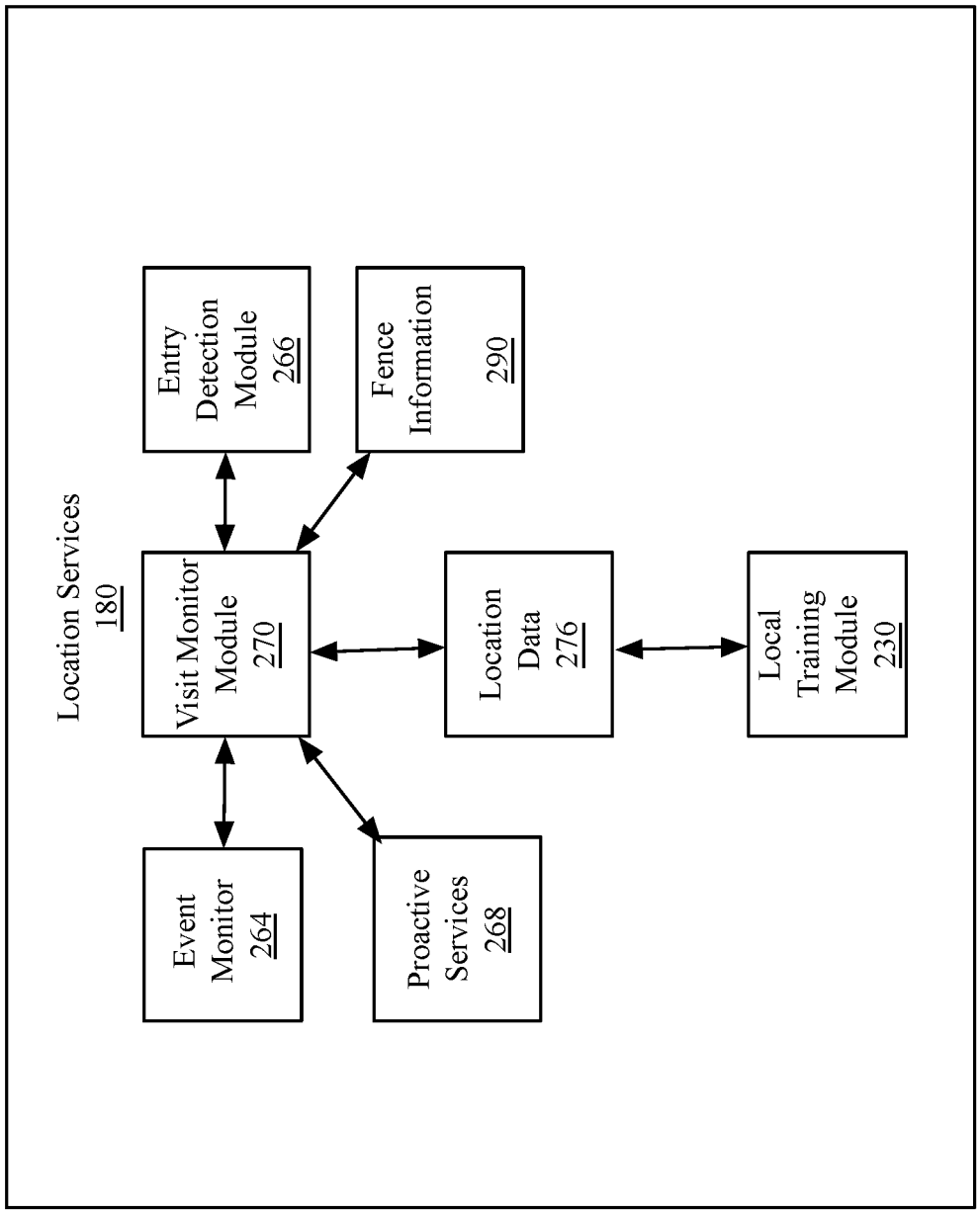
FIG. 2 is a block diagram for location services according to an embodiment.

FIG. 2 is a block diagram for location services according to an embodiment. Location services 180 may include an event monitor module 264 (e.g., a fence event monitor, location status monitor, sensor monitor, etc.) that may aid in determining when characteristics of location status modes should be adjusted for determining positioning information. Events monitor module 264 may rely on data from contextual user data sources to serve as cues for user context using heuristics and/or machine learning algorithms 186 to aid in determining user contexts that trigger adjustment of location status modes.

In some embodiments, the events monitor module 264 may use data to determine adjustments to location status modes that may impact power or performance for the operation of the electronic device. For example, mobile device 102 may be designated with an "in transit" state using a machine learning algorithm 186 and wireless connection status data may indicate that a Bluetooth connection is lost between the mobile device 102 and an accessory device, such as a vehicle entertainment system. Continuing with the example, the events monitor module 264 may determine from one or more contextual user data sources that there is at least one indication that there will be a change in location status of the mobile device 102, such as the mobile device 102 may be in transit to a defined location. User contextual data, such as crossing fence boundaries, exiting a vehicle, exiting a transit station, user routines, sensor data, etc., may be analyzed to predict that the electronic device is threshold distance from a defined location and that the location status mode for electronic device should be adjusted. The visit monitor module 270 may utilize event monitor 264, fence information 290, and entry detection module 266 to accurately detect entry to a defined location and reduce latency with provision of positioning information. The visit monitor module 270 may retrieve fence information 290 to define a more precise boundary for a defined location when the electronic device 102 is detected crossing a more coarse-grained geofence boundary, as detected using the entry detection module 266. In another embodiment, the visit monitor module 270 may retrieve expected sensor data (e.g., fingerprint data) characteristic of an electronic device 102 with the location status.

The proactive services 268 may be used to predict what applications and/or services that user may want to access given their user context and location status. For example, the user may want to access a particular application just prior to or upon entry to a location. Proactive services 268 may select locations based on user history of application selection or suggest a new application associated with a particular defined location. In an embodiment, proactive service 268 may adjust a rate at which periodic requests for determining positioning information.

In some embodiments, the electronic device 102 in FIGS. 3-11 is a mobile device 102 as described with FIGS. 1-2.

Figure 3:
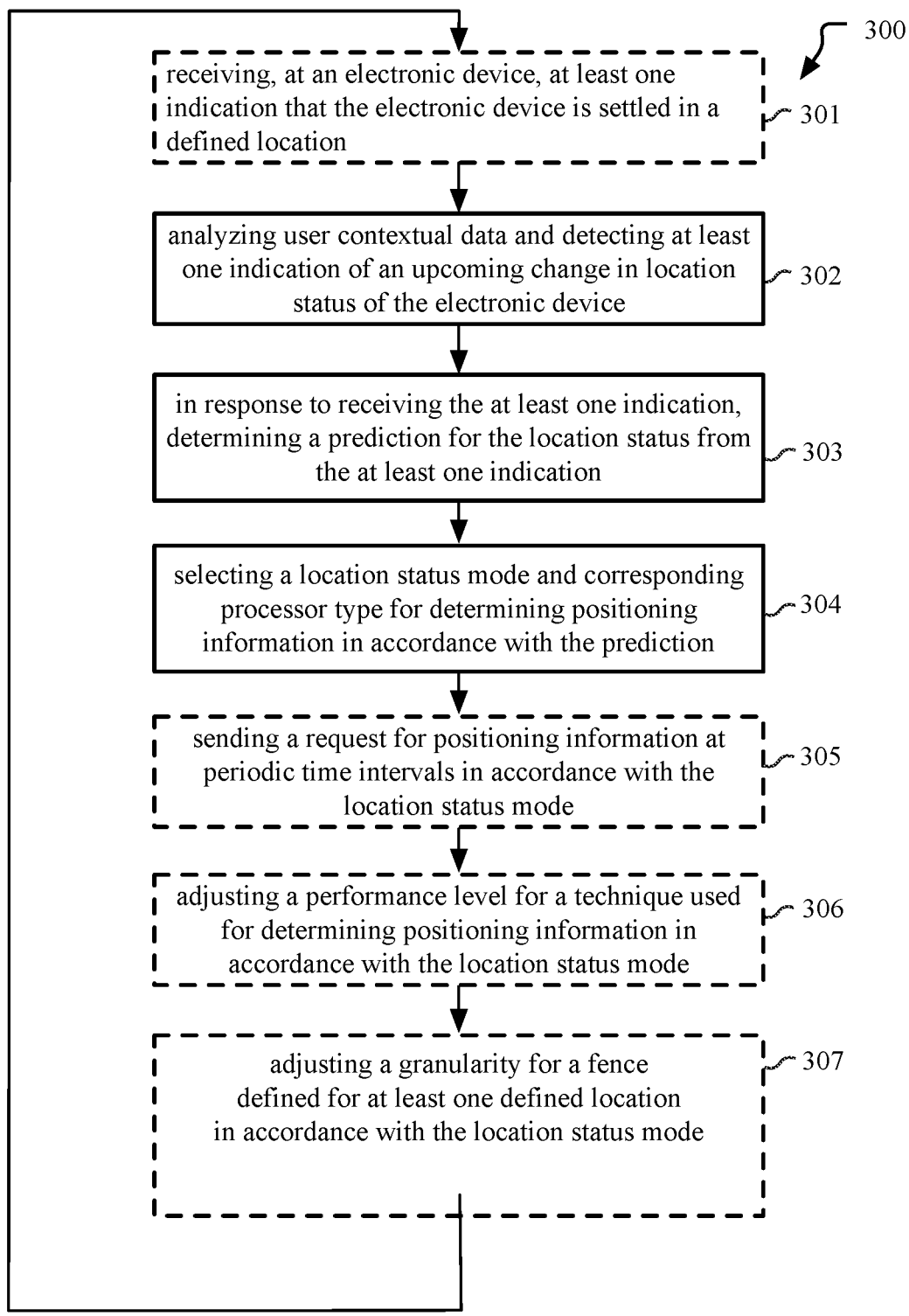
FIG. 3 is a flow diagram illustrating proactively adjusting modes for acquiring positioning information according to an embodiment.

FIG. 3 is a flow diagram 300 illustrating proactively adjusting location status modes and the corresponding resources (e.g., processor used, power state, etc.) of the electronic device relied on for acquiring positioning information according to an embodiment. Initially, in some embodiments, an electronic device 102 may begin with a "settled" location status (301). When an electronic device has a location status of "settled," the electronic device 102 may be in a quiescent state and the electronic device may not send requests for positioning information or may periodically request positioning information using the AOP to preserve resources (e.g., power) of the electronic device 102. In some embodiments, the positioning information requests may be performed as a process executing in the background on the electronic device 102 without user intervention.

The electronic device 102 receives at least one indication for an intention of the user to change their location status (302). The indication for the intention may be obtained from any contextual user data source accessible from an electronic device 102. The events monitor module 264 may analyze the contextual user data (e.g., application data, sensor data, device location history, wireless or wired connection status with accessory devices and/or services, and/or any other accessible data source) to determine whether there is an indication for an intention of the user to change their location status.

In response to receiving the at least one indication, the electronic device 102 determines a prediction for the location status (303). The location status may be a label assigned to the user context in relation to a location. Heuristics and/or machine learning algorithms 186 may be used to form a prediction for a location status including, but not limited to: in transit, settled, near at least one defined (e.g., trusted or known, etc.) location, at a defined location, entered a defined location, exited a known location, ventured off of a charted path within a map application, on a hike, extended duration of travel, and/or any other label to describe a position or relocating to a position. In some embodiments, the prediction for the location status is determined prior to receipt of the indication of the intention to change the location status.

The electronic device 102 selects a location status mode and a corresponding processor type for determining positioning information for the electronic device (304). The location status mode may optionally define a power state, a technique, a time period for the mode, device hardware, an algorithm, a time period for transitioning to another mode, and/or any other characteristics for determining positioning information. The location statues mode may be a low power mode for determining position for the electronic device that relies on particular hardware of the electronic device, such as the AOP and/or the radio processor. A processor type may be selected based on the location status. The processor type selected may be adjusted from a low power processor to application processor when the indication of the intent of the user is to enter a defined location. For example, if the indication is that the electronic device is a threshold distance from defined location, the electronic device crosses a fence for the defined location, wireless connections to vehicles, and/or the user routinely enters the particular defined location, then the positioning information may be determined using the AP.

The location status mode may define additional resources used by the electronic device 102 to service positioning request, such as whether Wi-Fi scanning and/or cell tower data is used in computing positioning information for the electronic device 102. The technique for determining positioning information may be selected based on the performance level desired for determining positioning for the electronic device 102 and the resources available with the electronic device 102. The resources accessible to the electronic device may include, but are not limited to, the following: processor types, battery life, access to cell or Wi-Fi service, and/any other characteristics of the electronic device 102. By way of example, the low power mode may use a low power processor (e.g., an always-on low power processor), if available with the electronic device 102. In other embodiments, the frequency of requests for positioning information may be altered to reduce the strain or impact to performance of the functionality of the electronic device.

The location status mode may indicate adjusting the performance for a technique used to determine position information. Optional steps 305 through 307 provide examples of determining positioning information in accordance with the selected location status mode. The electronic device 102 may request duty cycling of requests for positioning information at periodic time intervals in accordance with the location status mode (305). The periodic time interval selected may depend on the resources of the electronic device (e.g., power, Wi-Fi access, cell service, etc.) and the predicted location status. For example, the positioning information may be requested more frequently (e.g., short time interval) when the positioning information data may be useful for a proactively suggested application, such as a map application. In another example, the periodic time interval may be selected to preserve power when the location status prediction is that the electronic device may be in transit for an extended period of time and the positioning information may be useful for a user to retrace their path.

The electronic device may adjust a performance level of a technique used for determining positioning information (306). For example, the performance level for the technique may depend upon the resources or services relied upon for positioning information, such as motion sensors, cellular data, active Wi-Fi, and GPS scans, etc. The granularity for a fence defined for a location may be adjusted or refined (307). For example, when the indication of an upcoming location status is that a user is likely to enter a defined location, then a finer-grained fence may be established for the defined location. By way of example, a coarse-grained fence for a location may be a boundary defined with a location point and a radius from the location point to serve as a boundary for the defined location. Continuing with the example, a finer-grained or refinement for the initial geofence may be to compare the values for the electronic device 102 to values expected in regions of a defined location. The process may repeat for further analysis (302).

Figure 4:
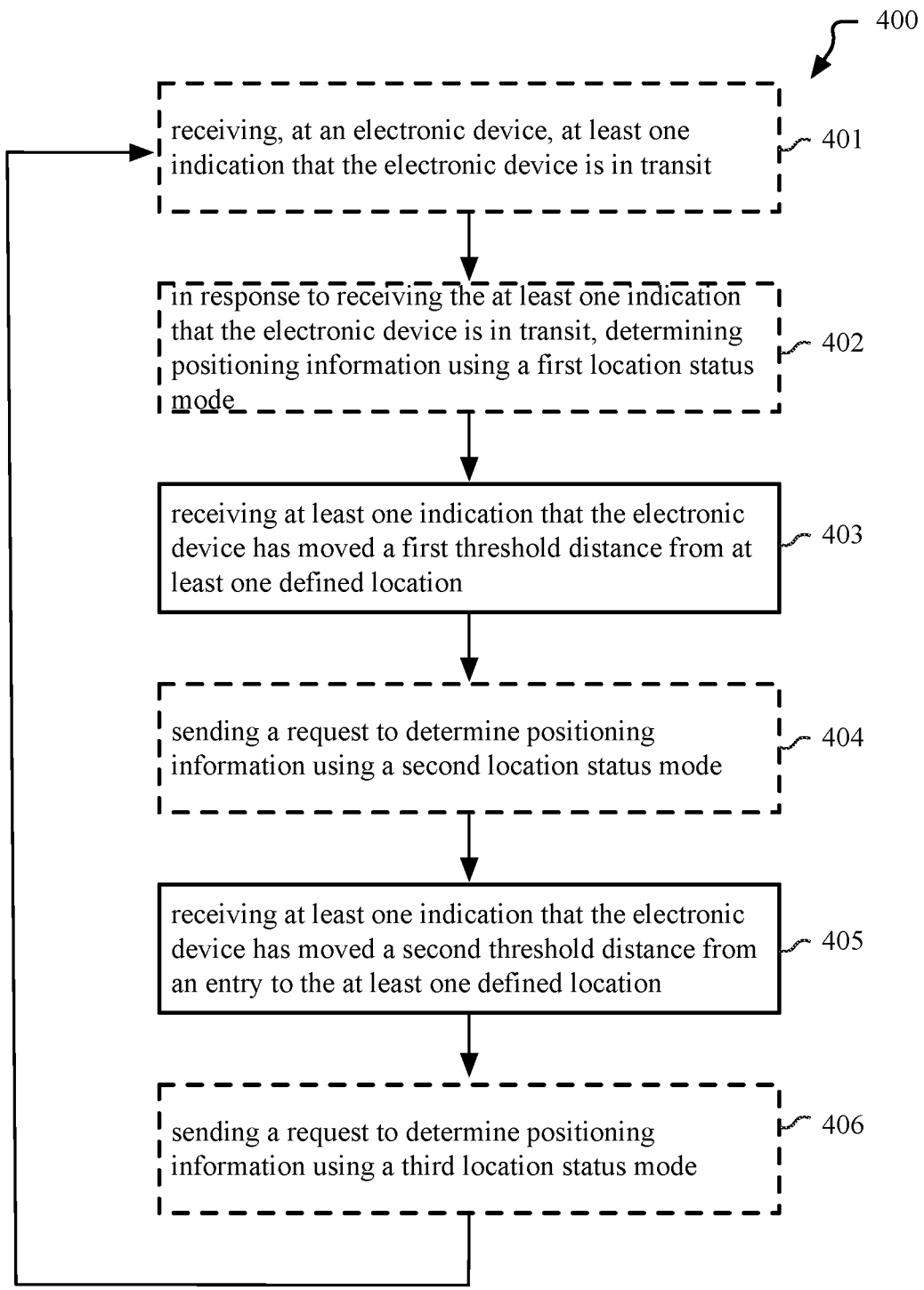
FIG. 4 is a flow diagram illustrating proactive selection of modes in accordance with some embodiments.

FIG. 4 is a flow diagram 400 illustrating proactive selection of location status modes in accordance with some embodiments. In this example, the processor type used for executing requests for positioning information and the granularity of established fences may be adjusted with location status mode changes. The electronic device 102 receives at least one indication of intent from contextual user data is received that the electronic device 102 of the user is in transit (401). Any number of contextual user data sources may be used to predict that the electronic device has the location status of "in transit." For example, the electronic device may be designated as "in transit" if sensors, such as an accelerometer and/or a gyroscope, detect movement and/or a velocity of the electronic device. Analysis of contextual data sources in addition to positioning information may allow for a prediction for the location status that the user is in transit to at least one defined location. For example, establishing or losing wireless connections with a vehicle and/or appliance may be an indication in addition to other information in combination with other data sources accessible on the electronic device to predict that the electronic device is "in transit." In another example, analysis of application data, such as calendar or map data, may be consistent with the predicted intention of the user in transit to the at least one defined location.

In response to receiving the at least one indication that the electronic device is in transit, the electronic device 102 may determine positioning information using a first location status mode (402). The first location status mode for the electronic device 102 in transit may obtain positioning information to determine if the user intends to enter a defined location. In the first location status mode, positioning information (e.g., GPS) may be determined using the low power processor (e.g., AOP), if the device has the low power processor. In some embodiments, the time interval for requesting positioning information using the AP may be adjusted to more frequently than in a settled location status depending on the resources available to the electronic device 102.

If the electronic device 102 has been moved to be within a first threshold distance of at least one defined location, then the electronic device 102 may establish a coarse-grained fence (403). The coarse-grained fence may be a defined boundary around one or more locations with a circumference or a radius to create a circular geofence around a set of defined locations or in the general vicinity around a defined location. For example, the coarse-grained fence may establish a boundary around a shopping center, a set of office buildings, a university, a park, and/or any other set of defined locations. In another example, the coarse-grained fence may establish an imprecise boundary around a particular defined location.

The electronic device 102 may receive at least one indication of intent from contextual user data that the electronic device 102 of the user is in transit to a defined location (404). Analysis of contextual data and received positioning information may indicate that the user intent is to enter a particular defined location. By way of example, sensor data, application data, and/or user routine data may indicate the intention of the user to enter the defined location. Optionally, the electronic device 102 may adjust the time interval for requests sent to determine positioning information with a second location status mode (404). In some embodiments, the time interval for requesting positioning information using the AP may be adjusted, such as more frequent requests depending on the resources available to the electronic device 102. The performance level for the positioning technique may optionally be adjusted as the user approaches the defined location.

The electronic device 102 may receive an indication that the electronic device 102 has moved a second threshold distance from an entry to a defined location (405). In some embodiments, a boundary for the first coarse-grained fence may be crossed and a finer-grained fence boundary may be established or reference fence information for fingerprint data may be retrieved for comparison with sensor data for the electronic device 102. For example, if the finer-grained fence boundary is crossed, then entry to the defined location may be assumed with the finer-grained fence boundary crossing and the electronic device may proactively store data and suggest services on the electronic device 102. In another example, sensor data received at the electronic device 102 may be compared against reference fence information for values expected in regions of the defined location. If received sensor values (e.g., RSSI values) for the electronic device 102 are characteristic for a the electronic device 102 being in a region of the defined location (e.g., in the defined location or the entry of the defined location), then entry may be assumed. Other indications of intent for entering the defined location may be determined from the user contextual data such as losing a wireless connection to a vehicle, leaving a transit station or vehicle, and/or establishing a Wi-Fi connection with an access point near or in the defined location.

Optionally, the electronic device 102 may send a request to adjust the time interval that requests are sent to determine positioning in a third location status mode (406). If analysis of the user contextual data provides that the user intent is to remain "settled" in the defined location, then the electronic device 102 may determine positioning information in a third location status mode. For example, the time interval for sending requests may be increased to (e.g., request sent every 15 mintues). The process may repeat at (401) when the electronic device 102 is detected as leaving the defined location.

Figure 5:
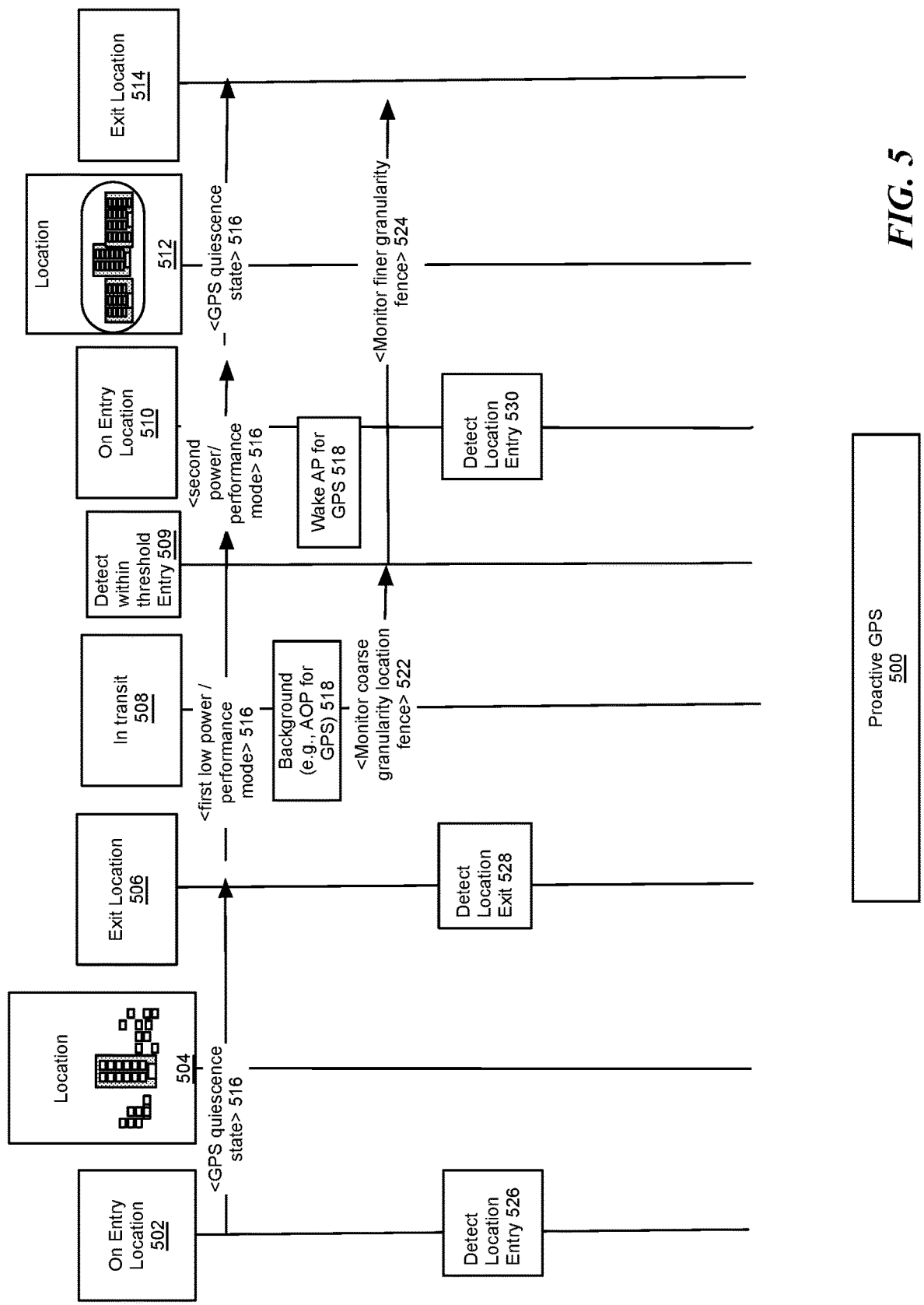
FIG. 5 is a timeline for location services in accordance with an embodiment.

FIG. 5 is a timeline for location services in accordance with an embodiment. On entry 502 to a location 504, the electronic device may be detected 526 and the electronic device may be in a quiescent state for determining positioning information. In a quiescent state, the frequency of requests for positioning information may be reduced or may not be performed at all until the device exits the location. The location exit 506 may be detected 528.

When the electronic device is in transit 508, the electronic device may use a low power processor 518 to periodically request positioning information with a defined time interval. In some embodiments, the low power mode may request that a first set of fence boundaries 522 be monitored for one or more defined locations as the electronic device is in transit.

The granularity of the fence boundaries may change from being coarse-grained to gradually becoming finer-grained for a defined location as data from one or more user contextual data sources provides indications that a user with the electronic device is predicted to be traveling toward a location. By way of example, a first fence boundary around one or more defined locations may be defined with a center point and a radius from the defined center point. The finer granularity for determining the positioning information for the defined location may also be further refined with comparison of sensor values of the electronic device 102 with reference sensor values (e.g., RSSI values) characteristic of electronic devices in regions of the defined location.

As the electronic device 102 moves closer to a particular location from the one or more defined locations, the granularity of the fence may become finer-grained or more refined. As shown, when the electronic device is detected within a threshold of an entry to a particular location 509, a finer granularity of fence boundary may be monitored for the electronic device. For example, a polygon shaped geofence boundary more closely resembling the boundary of a building and/or a land parcel for a defined location may be used. The polygon shaped geofence boundary may be determined from known building maps. In another embodiment, a geofence boundary for the defined location may be determined using fingerprints characteristic of the defined locations. Fingerprints are radio frequency (RF) technology (e.g., Wi-fi, Bluetooth, etc.) RSSI measurements from wireless access points that are recorded by electronic devices as characteristic of a location. In some embodiments, the fingerprints can be used as a reference to determine if another electronic device is near or far from the defined location or regions of the defined location.

Similarly, a second mode for determining positioning information may begin for the electronic device 516. The mode for determining positioning information may either be escalated or deescalated by determining positioning information by adjusting the power expended and impact to performance by the electronic device. As shown, the first mode is escalated with a finer grained fence 515 and a request to wake the application processor (AP) 518 in anticipation of needing more exact positioning information upon entry 510 of the location 512.

When the electronic device is settled in the location 512, then the mode may be deescalated to a quiescent state 520 until the electronic device is detected as exiting the location 514.

Figure 6:
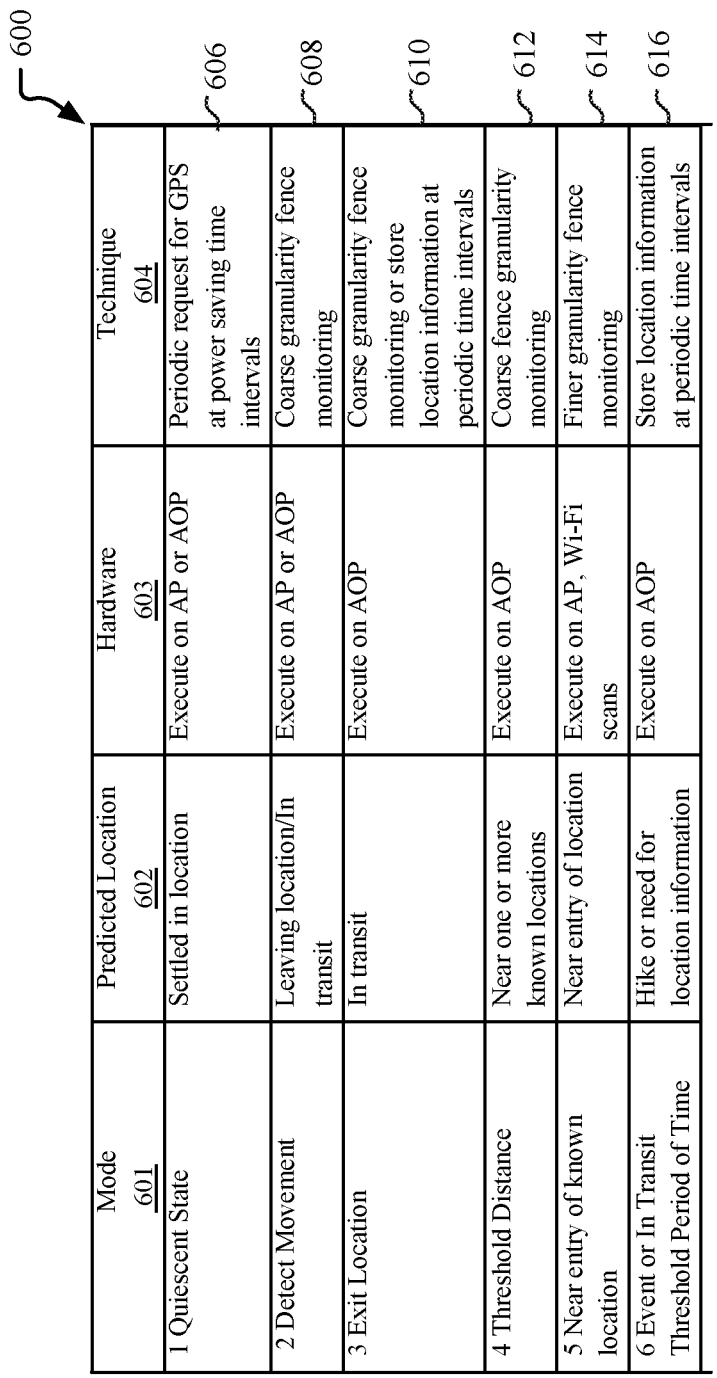
FIG. 6 is a diagram for location services in accordance with an embodiment.

FIG. 6 is a diagram 600 for location services in accordance with an embodiment. As shown in diagram 600, each location status mode 601 for a predicted location status 602 potential hardware 603 to be used for the location status mode 601 and technique 604. In mode 1, for a "quiescent state" mode represented in row 606, the predicted location status 602 is that the electronic device is settled in a defined location and a technique 604 of periodic request is performed for determining positioning information (e.g., GPS) at power saving time intervals executing on hardware 603, such as either the application processor (AP) or the always-on low power processor (AOP) may be performed.

In mode 2, for a "detected movement" mode represented in row 608, the predicted location status 602, as determined from user context data, for the electronic device 102 is that the user is leaving a defined location and/or in transit. A technique 604 of coarse-grained fence is established and positioning information is determined using either the AP or AOP 603, depending on the characteristics of the electronic device 102.

In mode 3, in "exit location" mode represented in row 610, the predicted location status 602 is that the electronic device is in transit to one or more defined locations and a technique 604 of periodic request for positioning information (e.g., GPS) at power saving time intervals executing on hardware 603, such as on the AOP may performed. A technique 604 of coarse-grained fence is established.

In mode 4, in "threshold distance" mode represented in row 612, the predicted location status 602 is that the electronic device is near one or more defined locations and a technique 604 of requests for positioning information may include coarse-grained fence being established.

In mode 5, in "near entry of defined location" mode represented in row 614, the predicted location status 602 is that the electronic device is near the entry of a defined location and a technique 604 of finer-grained fence is established with fence information on building map data and/or reference sensor data (e.g., RSSI values expected for the location entry).

In mode 6, in "event or in transit for threshold period of time" mode represented in row 616, the predicted location status 602 is that the electronic device will be in transit for a longer duration and/or will have limited service capabilities (e.g., Wi-Fi, cellular service, etc.) and a technique 604 of periodic request for positioning information (e.g., GPS) at power saving time intervals executing on hardware 603, such as on the AOP may performed.

Figure 7:
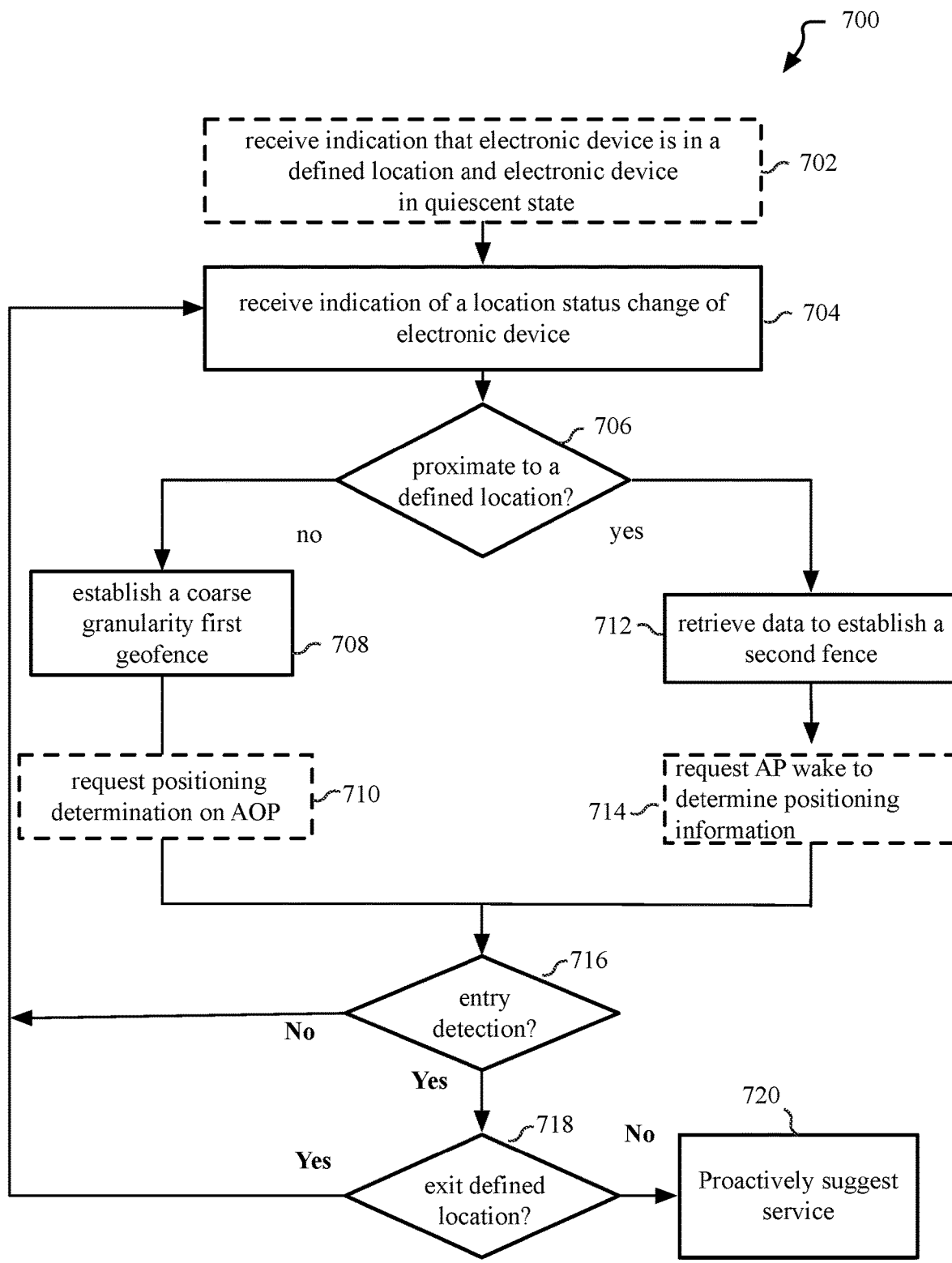
FIG. 7 is a flow diagram for location services in accordance with an embodiment.

FIG. 7 is a flow diagram 700 for location services in accordance with an embodiment. Optionally, the electronic device 102 may receive an indication that electronic device 102 is "settled" in a known location. In some embodiments, the electronic device 102 may be in a quiescent state and requests for positioning information may be minimized to preserve power and provide nearly full processing capabilities for applications and services executing on the electronic device 102.

The electronic device may receive an indication of a location status of the electronic device 102 (704). The indication of a potential upcoming location change may be triggered by any number of data sources that aid in determining the intent of the user from user context data. For example, the intent that the device is "in transit" may be inferred using sensor data, wireless connections to vehicle systems, use of transit cards, etc. Analysis may be performed with the data sources accessible on the electronic device to form a prediction for the location status. User contextual data in the form of application data (e.g., calendar data, map application data), historical data on routines for the user, crossing fences for defined locations while the electronic device 102 is in transit, etc. may be used to predict the location status.

Upon receipt of an indication of location status (706), the electronic device 102 may determine which fence type to establish. If the electronic device is predicted to be in transit according to the indication of location status (706), then a first coarse-grained fence is established (708) during transit when the electronic device 102 is near one or more defined locations. The first coarse grained fence may be established using a predefined radius and circumference for an area defined by application developers. The coarse-grained fence may be defined to encompass one or more defined locations. Optionally, the electronic device 102 may determine positioning information with a low power processor, such as the AOP or radio processor (710). In some embodiments, positioning information may be requested in the background in order to allow a user to retrace their path in a mapping and/or a navigation application.

In an embodiment, when the coarse-grained fence is crossed for a defined location, then application data and/or positioning data that may be preloaded in anticipation that the user may request the application. For example, application data related for applications related to the defined location, type of defined location, and/or historically used by the user at the defined location may be retrieved.

Continuing with FIG. 7, if the electronic device is predicted to be proximate to a defined location (706), then a finer-grained fence is established (712) with fence information for boundaries based on map data and/or reference data for expected sensor values characteristic of a region of the defined location (e.g., entrance). In this case, the electronic device may have crossed the first coarse-grained fence and the indication upon analysis of the user contextual data is that the user intends to enter the defined location. With the finer grained fence information, entry of a particular region of a defined location may be known and application data relevant the region of the defined location may be retrieved. For example, if a business has applications or application data that is relevant to a particular region of the business, then the data can be retrieved, such as a coffee establishment at one end of a grocery store may have different application than the bakery in another region. Optionally, a request may be sent to wake the AP to determine positioning information (e.g., GPS) for the electronic device 102 when the electronic device 102 crosses the first geofence boundary.

If entry of a defined location is not detected by the electronic device (716), then the process repeats to determine if the electronic device is in transit or proximate to a defined location (706). Alternatively, if the electronic device detects entry to the defined location (716) and no subsequent exit of the known location (718), then the electronic device 102 may proactively suggest a service and/or application (720). The defined location may serve as a basis for the type of service or application suggested to the user. For example, the client application for a museum or business may be recommended upon entry to the defined location. In some embodiments, historical data accessible on the electronic device may indicate the application or service that the user has most recently used in the defined location. A database may store applications or services that may be preloaded when the electronic device is a threshold distance from the defined location and/or suggested upon entry to a defined location.

Figure 8:
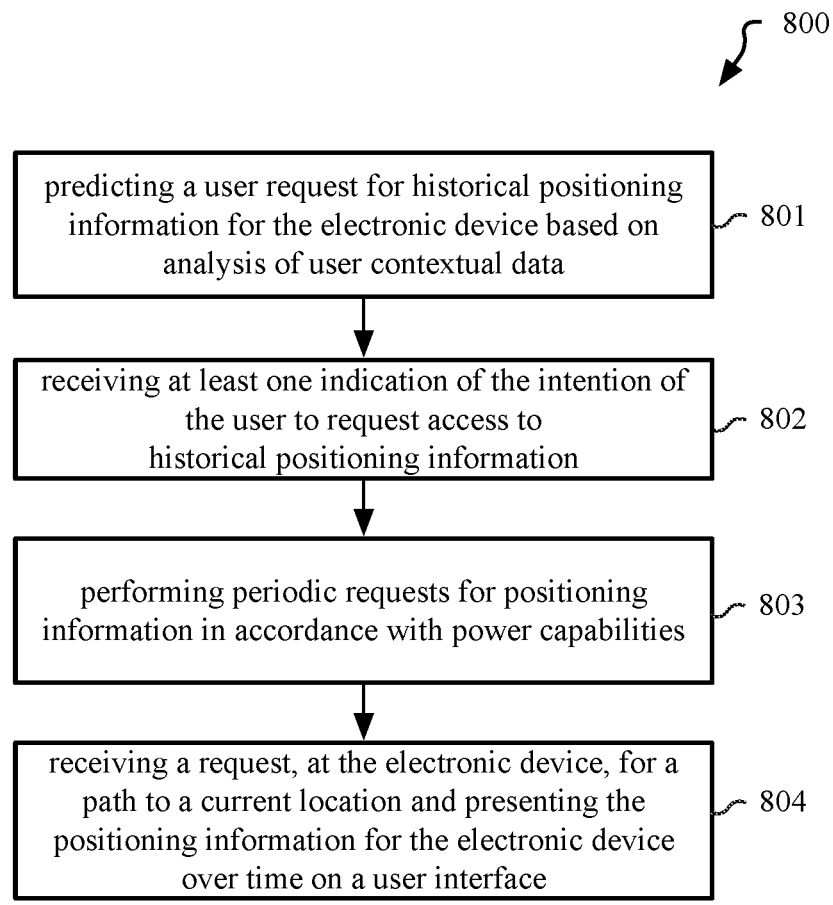
FIG. 8 is a flow diagram for location services in accordance with an embodiment.

FIG. 8 is a flow diagram 800 for location services in accordance with an embodiment. In some embodiments, location services may proactively obtain positioning information in anticipation of the user requesting access to the historical positioning information for use with an application, such as a map application. Contextual user data may be analyzed to predict that the user may request historical positioning information (801). For example, analysis of contextual user data may provide a prediction that positioning information for the most recent path or transit route taken may be requested by the user to allow the user to retrace their path. In some embodiments, contextual user data is analyzed to determine if the user is likely to get lost and/or not have access to positioning information due to loss of services (e.g., cellular or wi-fi services). In another example, historical routine data and/or application data (e.g., calendar data) may be analyzed to determine if the most recent positioning information for the user in transit is not part of the user's routine.

The electronic device 102 may receive at least one indication of the intention of the user to request access to the historical positioning information (802). The intention of the user to request such historical positioning data may be indicated by the electronic device 102 designated as in transit for a threshold duration and/or on a path with reduced access to services (e.g., cellular service, losing power). Certain activities or events indicated by contextual user data (e.g., application data) may serve as a predictor for needing access to historical positioning information and an intention to potentially request historical positioning information, such as sensor data or application data that indicates the user is exercising or walking. In another embodiment, analysis of user historical data may provide information on a routine transit route or path taken by the user, and the electronic device 102 may receive user contextual data that indicates the intention of the user to repeat the routine, such as exiting a vehicle at a parking lot near a recreational park, a hiking area, a ski area, and/or any other remote location.

Upon receiving an indication of the location status of a user intent to use an application that allows for retracing a path, the electronic device 102 may request that periodic requests for positioning information be sent in accordance with the power capabilities of the device (803). Coarse-grained geofences may be established where defined locations (e.g., ski chalets, national park offices, etc.) are found along the path to detect to obtain the positioning information of the user while in transit. In some embodiments, the AOP may be used to execute requests for positioning information (e.g., GPS). The positioning information over time may be presented upon request by the user at the electronic device 102 (804).

The user may be prompted to opt-in to allow the electronic device to proactively obtain positioning information when user contextual data indicates that the user may need to retrace their path, and the positioning information may be deleted when access to services, such as wireless connectivity or cellular service, have resumed.

Figure 9:
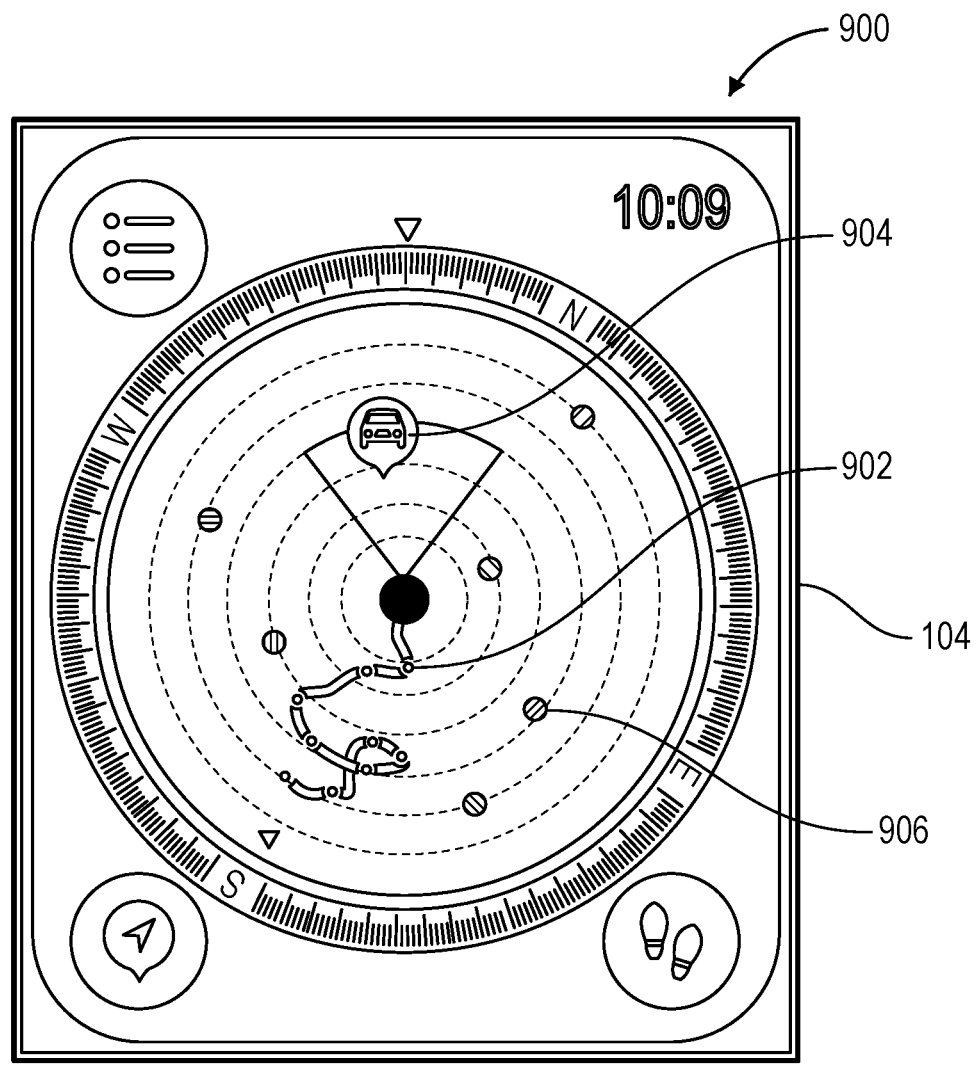
FIG. 9 depicts a user interface for location services in accordance with an embodiment.

FIG. 9 depicts a user interface 900 for location services in accordance with an embodiment. A navigation application 220 is depicted with an icon representing the location of a user's vehicle 904, waypoints 906 and a path 902 that a user has taken. The waypoint 906 and user vehicle 904 position may mark a place of special interest to the user and are depicted with an icon or marker as a relative position to a user's current location.

Figure 10A:
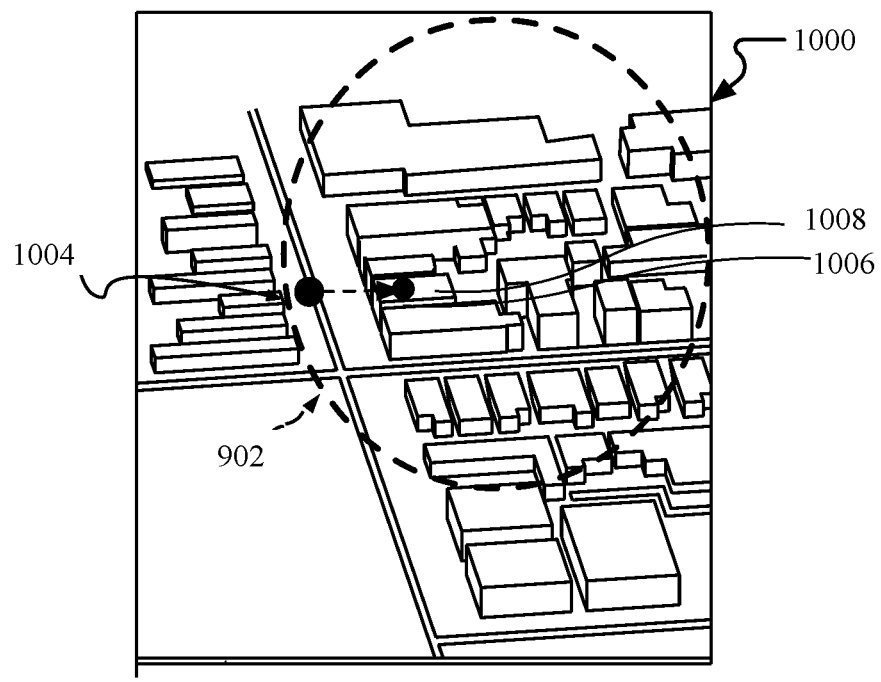
FIG. 10A-B depict illustrations of techniques for determining positioning information in accordance with an embodiment.

FIG. 10A depicts an illustration 1000 of techniques for determining positioning information in accordance with an embodiment. As shown in FIG. 10A, a first geofence coarse boundary 1002 is established for the electronic device. The electronic device is depicted as moving from a first position 1004 to a second position 1008 that is closer to a building 1006. As the electronic device moves to within a threshold distance from the building 1006, a finer grained second geofence boundary 1003 is established.

Figure 10B:
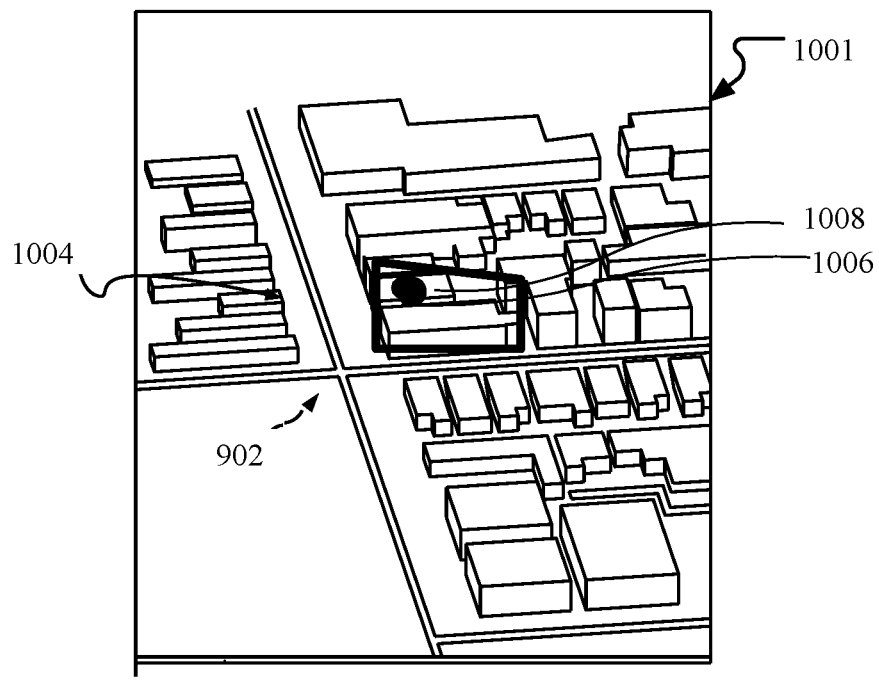

FIG. 10B depicts an illustration 1001 of techniques for determining positioning information in accordance with an embodiment. As shown in FIG. 10B, a second geofence boundary is established with a polygon shape that may allow for entry detection of the electronic device within building 1006.

Figure 11:
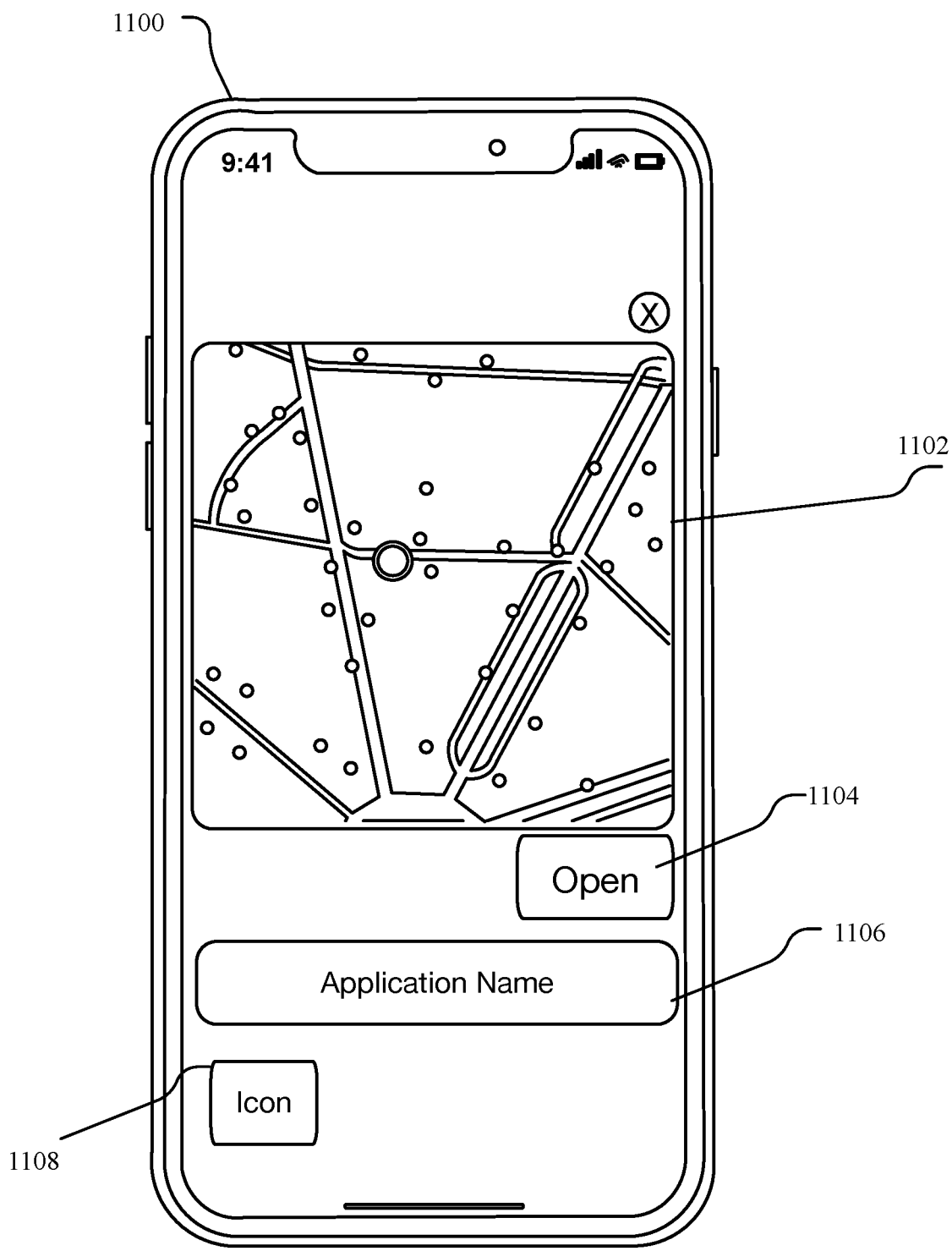
FIG. 11 depicts a user interface for location services in accordance with an embodiment.

FIG. 11 depicts a user interface 1100 for location services in accordance with an embodiment. When the electronic device 102 is detected within a threshold distance of a defined location, a client application or service suggestion 1102 may be displayed on the user interface 1100. As indicated previously in regard to FIG. 7, the application with the application name displayed in user interface element 1106 may be selected by the user for more information and the application or service may be accessed with user interface element 1106. The application or service 1106 with corresponding icon 1108 may be accessed in any number of ways, such as, but not limited to the following: open application locally stored on the electronic device, access remotely accessible application/service from the electronic device, download the application, and/or any combination thereof.

Figure 12:
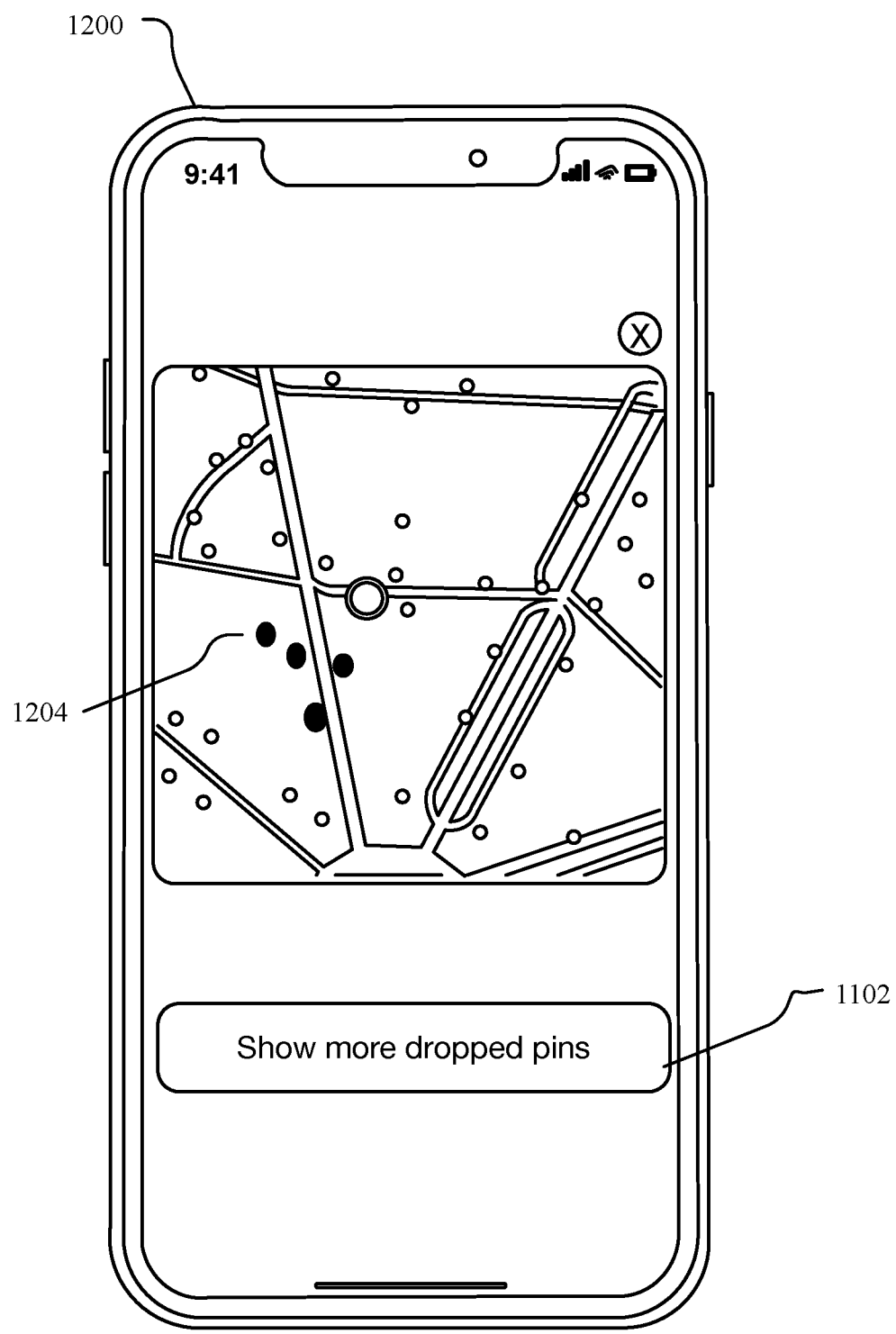
FIG. 12 depicts a user interface for location services in accordance with an embodiment.

FIG. 12 depicts a user interface 1200 for location services in accordance with an embodiment. As indicated above in regard to FIG. 8, positioning information may be proactively stored at periodic intervals if the user context indicates that the user may need to know the path of travel. In user interface 1200, a path that a user has taken is displayed on a map 1204 and the user interface element 1202 is displayed to allow the user to request more of their positioning history.

Figure 13:
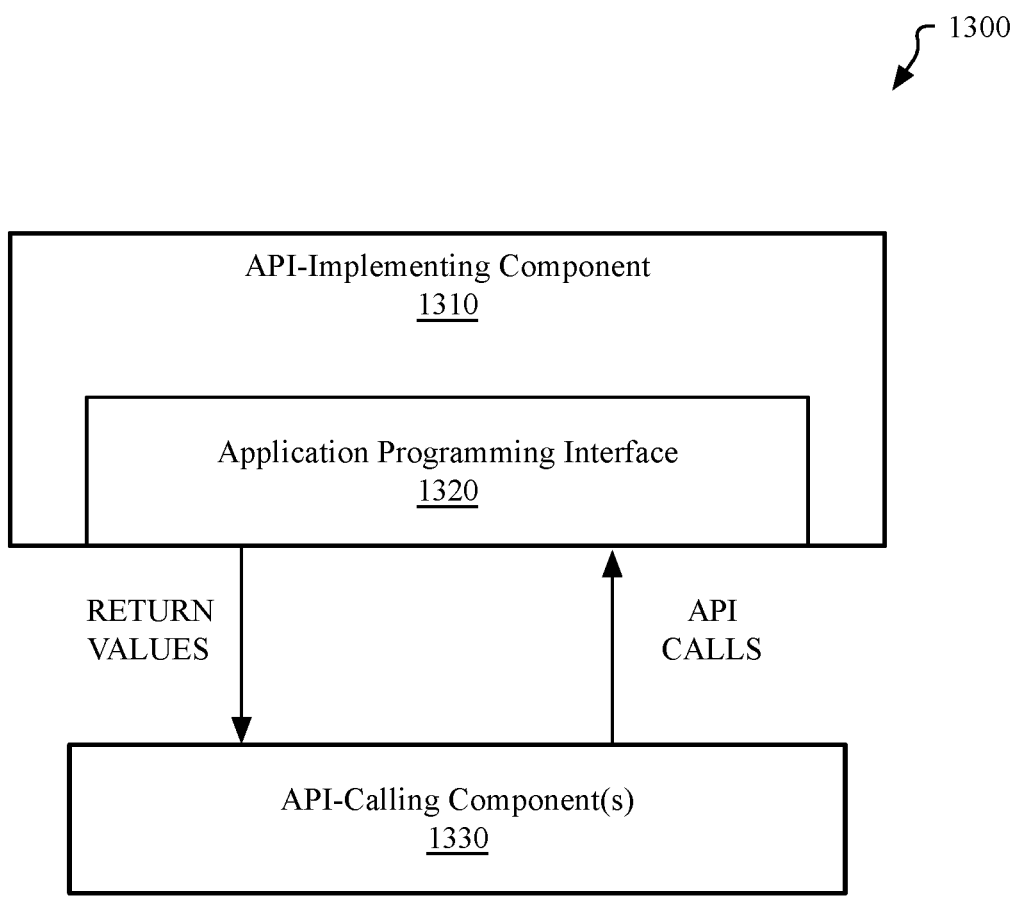
FIG. 13 is a block diagram of a device architecture for a mobile or embedded device, according to an embodiment

FIG. 13 is a block diagram illustrating an exemplary API architecture, which may be used in some embodiments of the invention. As shown in FIG. 13, the API architecture 1300 includes the API-implementing component 1310 (e.g., an operating system, a library, a device driver, an API, an application program, software or other module) that implements the API 1320. The API 1320 specifies one or more functions, methods, classes, objects, protocols, data structures, formats and/or other features of the API-implementing component that may be used by the API-calling component 1330. The API 1320 can specify at least one calling convention that specifies how a function in the API-implementing component receives parameters from the API-calling component and how the function returns a result to the API-calling component. The API-calling component 1330 (e.g., an operating system, a library, a device driver, an API, an application program, software or other module), makes API calls through the API 1320 to access and use the features of the API-implementing component 1310 that are specified by the API 1320. The API-implementing component 1310 may return a value through the API 1320 to the API-calling component 1330 in response to an API call.

It will be appreciated that the API-implementing component 1310 may include additional functions, methods, classes, data structures, and/or other features that are not specified through the API 1320 and are not available to the API-calling component 1330. It should be understood that the API-calling component 1330 may be on the same system as the API-implementing component 1310 or may be located remotely and accesses the API-implementing component 1310 using the API 1320 over a network. While FIG. 13 illustrates a single API-calling component 1330 interacting with the API 1320, it should be understood that other API-calling components, which may be written in different languages (or the same language) than the API-calling component 1330, may use the API 1320.

The API-implementing component 1310, the API 1320, and the API-calling component 1330 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 14:
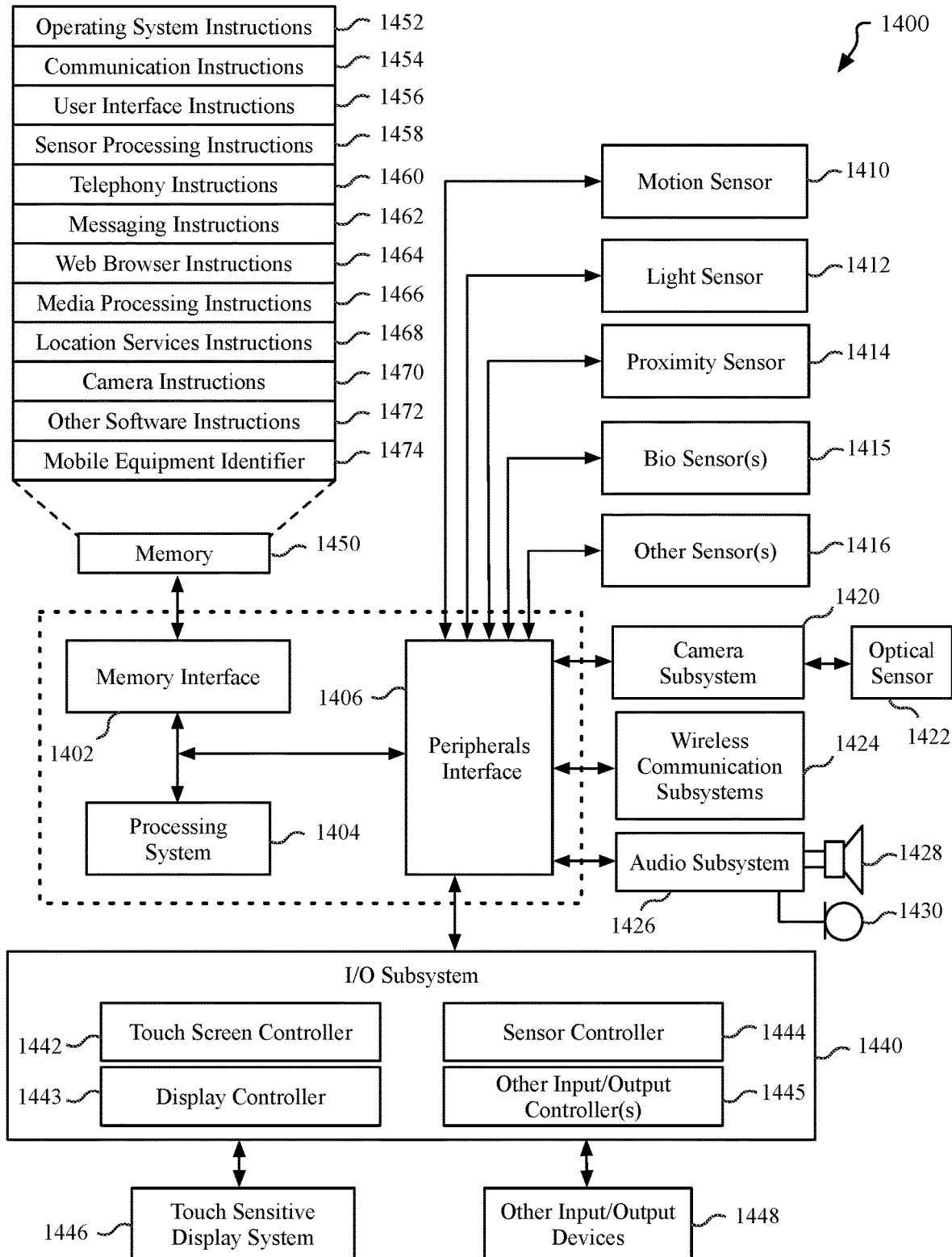
FIG. 14 is a block diagram of a computing system, according to an embodiment.

FIG. 14 is a block diagram of a device architecture 1400 for a mobile or embedded device, according to an embodiment. The device architecture 1400 includes a memory interface 1402, a processing system 1404 including one or more data processors, image processors and/or graphics processing units, and a peripherals interface 1406. The various components can be coupled by one or more communication buses or signal lines. The various components can be separate logical components or devices or can be integrated in one or more integrated circuits, such as in a system on a chip integrated circuit.

The memory interface 1402 can be coupled to memory 1450, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1406 to facilitate multiple functionalities. For example, a motion sensor 1410, a light sensor 1412, and a proximity sensor 1414 can be coupled to the peripherals interface 1406 to facilitate the mobile device functionality. One or more biometric sensor(s) 1415 may also be present, such as a fingerprint scanner for fingerprint recognition or an image sensor for facial recognition. Other sensors 1416 can also be connected to the peripherals interface 1406, such as a positioning system (e.g., GPS receiver), a temperature sensor, or other sensing device, to facilitate related functionalities. In an embodiment, the positioning system may have a radio processor (e.g., GPS processor) capable of solving navigation equations to determine user position, velocity, and/or time by processing the signals broadcast. A camera subsystem 1420 and an optical sensor 1422, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1424, which can include radio frequency receivers and transmitters and/or optical (e.g., infrared) receivers and transmitters. The specific design and implementation of the wireless communication subsystems 1424 can depend on the communication network(s) over which a mobile device is intended to operate. For example, a mobile device including the illustrated device architecture 1400 can include wireless communication subsystems 1424 designed to operate over a GSM network, a CDMA network, an LTE network, a Wi-Fi network, a Bluetooth network, or any other wireless network. In particular, the wireless communication subsystems 1424 can provide a communications mechanism over which a media playback application can retrieve resources from a remote media server or scheduled events from a remote calendar or event server.

An audio subsystem 1426 can be coupled to a speaker 1428 and a microphone 1430 to facilitate voice-enabled functions, such as voice recognition, voice replication, digital recording, and telephony functions. In smart media devices described herein, the audio subsystem 1426 can be a high-quality audio system including support for virtual surround sound.

The I/O subsystem 1440 can include a touch screen controller 1442 and/or other input controller(s) 1445. For computing devices including a display device, the touch screen controller 1442 can be coupled to a touch sensitive display system 1446 (e.g., touch-screen). The touch sensitive display system 1446 and touch screen controller 1442 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1446. Display output for the touch sensitive display system 1446 can be generated by a display controller 1443. In one embodiment, the display controller 1443 can provide frame data to the touch sensitive display system 1446 at a variable frame rate.

In one embodiment, a sensor controller 1444 is included to monitor, control, and/or processes data received from one or more of the motion sensor 1410, light sensor 1412, proximity sensor 1414, or other sensors 1416. The sensor controller 1444 can include logic to interpret sensor data to determine the occurrence of one of more motion events or activities by analysis of the sensor data from the sensors.

In one embodiment, the I/O subsystem 1440 includes other input controller(s) 1445 that can be coupled to other input/control devices 1448, such as one or more buttons, rocker switches, thumb-wheel, infrared port, USB port, and/or a pointer device such as a stylus, or control devices such as an up/down button for volume control of the speaker 1428 and/or the microphone 1430.

In one embodiment, the memory 1450 coupled to the memory interface 1402 can store instructions for an operating system 1452, including portable operating system interface (POSIX) compliant and non-compliant operating system or an embedded operating system. The operating system 1452 may include instructions for handling basic system services and for performing hardware dependent tasks. In some implementations, the operating system 1452 can be a kernel.

The memory 1450 can also store communication instructions 1454 to facilitate communicating with one or more additional devices, one or more computers and/or one or more servers, for example, to retrieve web resources from remote web servers. The memory 1450 can also include user interface instructions 1456, including graphical user interface instructions to facilitate graphic user interface processing.

Additionally, the memory 1450 can store sensor processing instructions 1458 to facilitate sensor-related processing and functions; telephony instructions 1460 to facilitate telephone-related processes and functions; messaging instructions 1462 to facilitate electronic-messaging related processes and functions; web browser instructions 1464 to facilitate web browsing-related processes and functions; media processing instructions 1466 to facilitate media processing-related processes and functions; location services instructions including GPS and/or navigation instructions 1468 and Wi-Fi based location instructions to facilitate location based functionality; camera instructions 1470 to facilitate camera-related processes and functions; and/or other software instructions 1472 to facilitate other processes and functions, e.g., security processes and functions, and processes and functions related to the systems. The memory 1450 may also store other software instructions such as web video instructions to facilitate web video-related processes and functions; and/or web shopping instructions to facilitate web shopping-related processes and functions. In some implementations, the media processing instructions 1466 are divided into audio processing instructions and video processing instructions to facilitate audio processing-related processes and functions and video processing-related processes and functions, respectively. A mobile equipment identifier, such as an International Mobile Equipment Identity (IMEI) 1474 or a similar hardware identifier can also be stored in memory 1450.

Each of the above identified instructions and applications can correspond to a set of instructions for performing one or more functions described above. These instructions need not be implemented as separate software programs, procedures, or modules. The memory 1450 can include additional instructions or fewer instructions. Furthermore, various functions may be implemented in hardware and/or in software, including in one or more signal processing and/or application specific integrated circuits.

Figure 15:
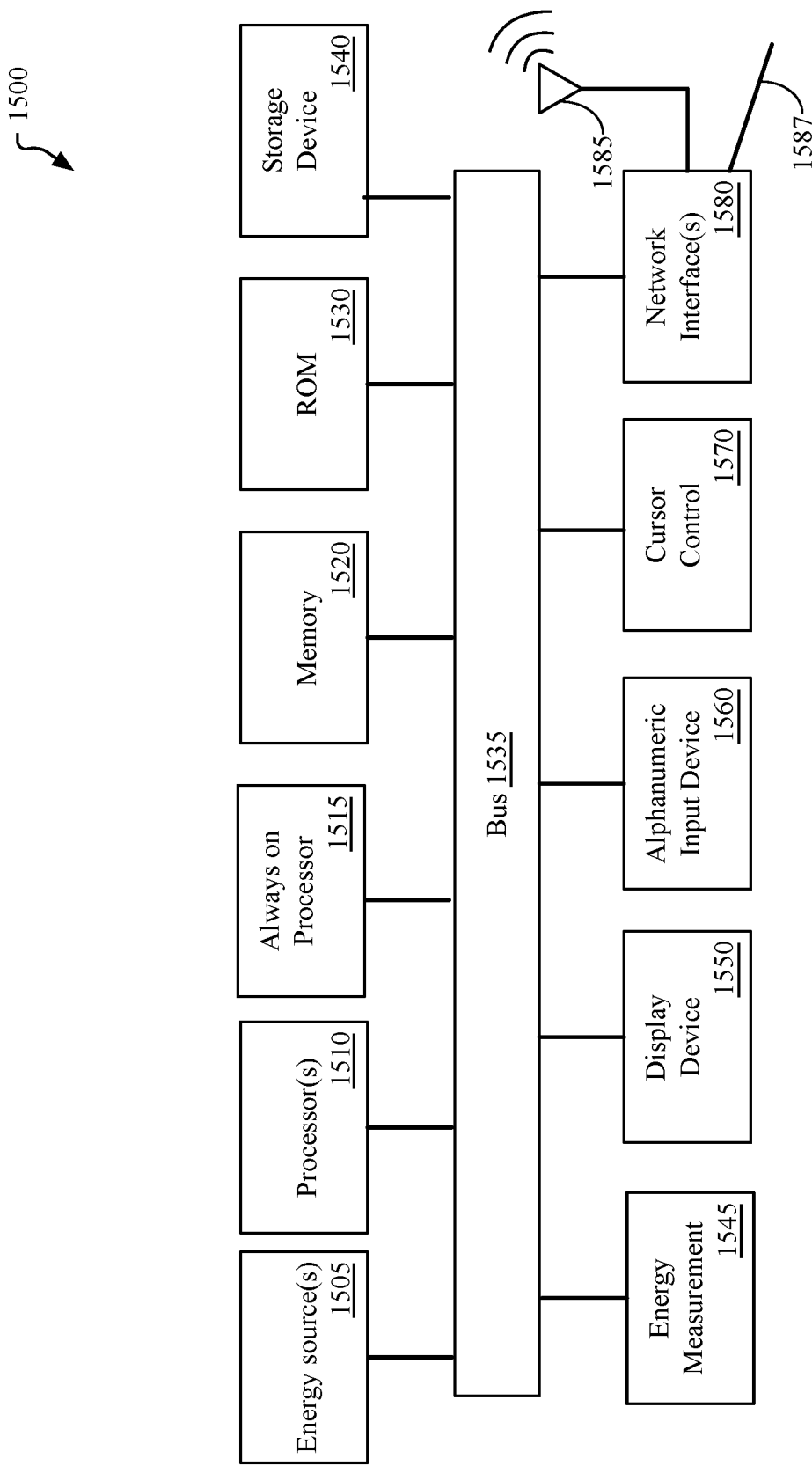
FIG. 15 is a block diagram of a computing system 1500, according to an embodiment.

FIG. 15 is a block diagram of a computing system 1500, according to an embodiment. The illustrated computing system 1500 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1500 can be used to provide the computing device and/or a server device to which the computing device may connect.

The computing system 1500 includes bus 1535 or other communication device to communicate information, and processor(s) 1510 coupled to bus 1535 that may process information. While the computing system 1500 is illustrated with a single processor, the computing system 1500 may include multiple processors, low power processors, and/or co-processors. The computing system 1500 further may include memory 1520 in the form of random access memory (RAM) or other dynamic storage device coupled to the bus 1535. The memory 1520 may store information and instructions that may be executed by processor(s) 1510. In an embodiment, the memory 1420 may store instructions that may be executed by a low power processor 1415, such as the AOP. In an embodiment, the low power processor 1415 may be a component of a system on a chip (SOC) that remains powered when the remainder of the SOC is powered off. Implementations of the low power processor 1415 may be found in U.S. Pat. No. 11,079,261, which is herein incorporated by reference. The memory 1520 may also be main memory that is used to store temporary variables or other intermediate information during execution of instructions by the processor(s) 1510.

The computing system 1500 may also include read only memory (ROM) 1530 and/or another data storage device 1540 coupled to the bus 1535 that may store information and instructions for the processor(s) 1510. The data storage device 1540 can be or include a variety of storage devices, such as a flash memory device, a magnetic disk, or an optical disc and may be coupled to computing system 1500 via the bus 1535 or via a remote peripheral interface.

The computing system 1500 may also be coupled, via the bus 1535, to a display device 1550 to display information to a user. The computing system 1500 can also include an alphanumeric input device 1560, including alphanumeric and other keys, which may be coupled to bus 1535 to communicate information and command selections to processor(s) 1510. Another type of user input device includes a cursor control 1570 device, such as a touchpad, a mouse, a trackball, or cursor direction keys to communicate direction information and command selections to processor(s) 1510 and to control cursor movement on the display device 1550. The computing system 1500 may also receive user input from a remote device that is communicatively coupled via one or more network interface(s) 1580.

The computing system 1500 further may include one or more network interface(s) 1580 to provide access to a network, such as a local area network. The network interface(s) 1580 may include, for example, a wireless network interface having antenna 1585, which may represent one or more antenna(e). The computing system 1500 can include multiple wireless network interfaces such as a combination of Wi-Fi, Bluetooth®, near field communication (NFC), and/or cellular telephony interfaces. The network interface(s) 1580 may also include, for example, a wired network interface to communicate with remote devices via network cable 1587, which may be, for example, an Ethernet cable, a coaxial cable, a fiber optic cable, a serial cable, or a parallel cable.

In one embodiment, the network interface(s) 1580 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1580 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1500 can further include one or more energy sources 1505 and one or more energy measurement systems 1545. Energy sources 1505 can include an AC/DC adapter coupled to an external power source, one or more batteries, one or more charge storage devices, a USB charger, or other energy source. Energy measurement systems include at least one voltage or amperage measuring device that can measure energy consumed by the computing system 1500 during a predetermined period of time. Additionally, one or more energy measurement systems can be included that measure, e.g., energy consumed by a display device, cooling subsystem, Wi-Fi subsystem, or other frequently used or high-energy consumption subsystem In utilizing the various aspects of the embodiments, it would become apparent to one skilled in the art that combinations or variations of the above embodiments are possible. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method comprising:
   receiving at least one indication that an electronic device is in transit to at least one defined location;
   in response to receiving the at least one indication that the electronic device is in transit to the at least one defined location, selecting a first processor of a plurality of processors for determining positioning information for the electronic device, the first processor selected based at least in part on a location criterion or a power criterion;
   establishing a first fence boundary for the at least one defined location;
   receiving an indication that the electronic device has crossed the first fence boundary and is in transit to a defined location;
   in response to receiving the indication that the electronic device crosses the first fence boundary, selecting a second processor of the plurality of processors for determining positioning information for the electronic device, the second processor selected based at least in part on the location criterion or the power criterion; and establishing a second fence for the defined location, wherein the second fence provides a finer granularity fence for the defined location than the first fence.

2. The method of claim 1, further comprising:

in response to receiving the indication that the electronic device crosses the first fence boundary, sending a request for application data associated with the defined location;

upon detection of entry to the defined location with the second fence, presenting an interface for an application associated with the defined location; and launching the application with the received application data from the request.

3. The method of claim 1, further comprising, in response to receiving the at least one indication that the electronic device crossed the first fence boundary, determining positioning information using a second mode, wherein the second mode comprises determining positioning information at periodic time intervals at a second performance and power state.

4. The method of claim 1, wherein the first processor comprises a low power processor, wherein the second processor comprises an application processor, and wherein the low power processor consumes less power than the application processor during operation.

5. The method of claim 1, wherein the power criterion comprises a performance and power state.

6. The method of claim 1, wherein the location criterion comprises a location current location state, a motion state, a mode of transport, or a prediction of a change in location state.

7. The method of claim 1, further comprising retrieving information on establishing the second fence for the defined location.

8. The method of claim 7, wherein the information comprises at least one of a radio frequency fingerprint or a building map, and wherein establishing the second fence for the defined location comprises establishing the second fence using the information.

9. The method of claim 1, further comprising, in response to receiving the at least one indication that the electronic device is in transit, determining positioning information using a first mode, wherein the first mode comprises determining positioning information at periodic time intervals at a first performance and power state.

10. The method of claim 9, further comprising:

storing positioning information at each periodic time interval.

11. The method of claim 9, wherein the first mode further comprises:

determining positioning information at periodic time intervals using the first processor.

12. An electronic user device, comprising:

a plurality of processors comprising a first processor and a second processor; and one or more memories storing computer-executable instructions that, when executed by at least one processor of the plurality of processors, cause the electronic user device to at least:

receive at least one indication that the electronic user device is in transit to at least one defined location;

in response to receiving the at least one indication that the electronic user device is in transit to the at least one defined location, select the first processor for determining positioning information for the electronic user device, the first processor selected based at least in part on a location criterion or a power criterion;

establish a first fence boundary for the at least one defined location;

receive an indication that the electronic user device has crossed the first fence and is in transit to a defined location;

in response to receiving the indication that the electronic user device crosses the first fence boundary, select the second processor for determining positioning information for the electronic user device, the second processor selected based at least in part on the location criterion or the power criterion; and establish a second fence for the defined location, wherein the second fence provides a finer granularity fence for the defined location than the first fence.

13. The electronic user device of claim 12, wherein the one or more memories store additional computer-executable instructions that, when executed by the at least one processor of the plurality of processors, cause the electronic user device to further:

in response to receiving the indication that the electronic device crosses the first fence boundary, send a request for application data associated with the defined location;

upon detection of entry to the defined location with the second fence, present an interface for an application associated with the defined location; and launch the application with the received application data from the request.

14. The electronic user device of claim 12, wherein the one or more memories store additional computer-executable instructions that, when executed by the at least one processor of the plurality of processors, cause the electronic user device to further retrieve information on establishing the second fence for the defined location.

15. The electronic user device of claim 14, wherein the information comprises at least one of a radio frequency fingerprint or a building map, and wherein establishing the second fence for the defined location comprises establishing the second fence using the information.

16. A non-transitory computer readable medium storing computer-executable instructions that, when executed by at least one processor of a plurality of processors of an electronic device, cause the electronic device to at least:

receive at least one indication that the electronic device is in transit to at least one defined location;

in response to receiving the at least one indication that the electronic device is in transit to the at least one defined location, select a first processor of the plurality of processors for determining positioning information for the electronic device, the first processor selected based at least in part on a location criterion or a power criterion;

establish a first fence boundary for the at least one defined location;

receive an indication that the electronic device has crossed the first fence boundary and is in transit to a defined location;

in response to receiving the indication that the electronic device crosses the first fence boundary, select a second processor of the plurality of processors for determining positioning information for the electronic device, the second processor selected based at least in part on the location criterion or the power criterion; and establish a second fence for the defined location, wherein the second fence provides a finer granularity fence for the defined location than the first fence.

17. The non-transitory computer readable medium of claim 16, storing additional computer-executable instructions that, when executed by the at least one processor of the plurality of processors, cause the electronic device to further, in response to receiving the at least one indication that the electronic device crossed the first fence boundary, determine positioning information using a second mode, wherein the second mode comprises determining positioning information at periodic time intervals at a second performance and power state.

18. The non-transitory computer readable medium of claim 16, storing additional computer-executable instructions that, when executed by the at least one processor of the plurality of processors, cause the electronic device to further, in response to receiving the at least one indication that the electronic device is in transit, determine positioning information using a first mode, wherein the first mode comprises determining positioning information at periodic time intervals at a first performance and power state.

19. The non-transitory computer readable medium of claim 18, storing additional computer-executable instructions that, when executed by the at least one processor of the plurality of processors, cause the electronic device to further store positioning information at each periodic time interval.

20. The non-transitory computer readable medium of claim 18, wherein the first mode further comprises determining positioning information at periodic time intervals using the first processor.

* * * * *